United States Patent
Rachwal

(10) Patent No.: US 6,388,390 B2
(45) Date of Patent: May 14, 2002

(54) FLASHLIGHT

(76) Inventor: Erwin J. Rachwal, 4975 Southern Wood Dr., Sarasota, FL (US) 34241

( * ) Notice: Subject to any disclaimer, the term of this patent is extended or adjusted under 35 U.S.C. 154(b) by 0 days.

(21) Appl. No.: 09/849,937

(22) Filed: May 4, 2001

Related U.S. Application Data

(60) Continuation-in-part of application No. 09/658,142, filed on Sep. 8, 2000, now Pat. No. 6,239,555, which is a division of application No. 09/268,520, filed on Apr. 6, 1999, now Pat. No. 6,140,776.

(51) Int. Cl.[7] .............................................. H05B 37/00
(52) U.S. Cl. ................... 315/200 R; 362/202; 362/205; 362/208
(58) Field of Search ........................... 315/200 R, 224, 315/291; 362/84, 202, 205, 208, 800, 802

(56) References Cited

U.S. PATENT DOCUMENTS

| | | | |
|---|---|---|---|
| 2,092,845 A | 9/1937 | Holmes | 240/10.5 |
| 2,105,719 A | 1/1938 | Collins | 171/76 |
| 2,261,073 A | 10/1941 | Painter | 67/29 |
| 3,099,402 A | 7/1963 | Speck | 240/10.66 |
| 3,805,096 A | 4/1974 | Hamilton, II | 307/308 |
| 3,991,329 A | 11/1976 | Iwasa et al. | 307/308 |
| 4,055,755 A | 10/1977 | Nakamura et al. | 364/705 |
| 4,063,111 A | 12/1977 | Dobler et al. | 307/116 |
| 4,090,353 A | 5/1978 | Maeda et al. | 307/116 |
| 4,099,074 A | 7/1978 | Maeda et al. | 307/308 |
| 4,144,557 A | 3/1979 | Kerr, III et al. | 362/84 |
| 4,160,923 A | 7/1979 | Maeda et al. | 307/308 |
| 4,160,934 A | 7/1979 | Kirsch | 315/307 |
| 4,163,923 A | 8/1979 | Herbers et al. | 315/208 |
| 4,207,479 A | 6/1980 | Yamamoto et al. | 307/308 |
| 4,228,484 A | 10/1980 | Johnstone | 362/184 |
| 4,250,432 A | 2/1981 | Kohler | 315/291 |
| 4,290,095 A | 9/1981 | Schmidt | 362/191 |
| 4,315,301 A | 2/1982 | Jimena | 362/193 |
| 4,546,416 A | 10/1985 | Pemberton | 362/84 |
| 4,701,835 A | 10/1987 | Campagnuolo et al. | 362/192 |
| 4,774,644 A | 9/1988 | Ohashi | 362/202 |
| 4,866,580 A | 9/1989 | Blackerby | 362/800 |
| 4,878,107 A | 10/1989 | Hopper | 357/72 |
| 5,138,538 A | 8/1992 | Sperling | 362/802 |
| 5,552,973 A | 9/1996 | Hsu | 362/192 |
| 5,584,561 A | 12/1996 | Lahos | 362/72 |
| 5,633,623 A | 5/1997 | Campman | 340/321 |
| 5,685,632 A | 11/1997 | Schaller et al. | 362/205 |
| 5,806,961 A | * 9/1998 | Dalton et al. | 362/183 |
| 5,839,821 A | 11/1998 | LeZotte | 362/208 |
| 5,909,952 A | 6/1999 | Guthrie et al. | 362/202 |
| 5,931,562 A | 8/1999 | Arato | 362/205 |
| 5,975,714 A | 11/1999 | Vetorino et al. | 362/205 |
| 6,160,355 A | * 12/2000 | Yee | 315/224 |
| 6,249,089 B1 | 6/2001 | Bruwer | 315/200 A |

OTHER PUBLICATIONS

Article entitled "Solar Lanterns and Flashlights" by Jade Mountain, Inc., copyright 1998.
Article entitled "Twelve Volt DC Red and Yellow High Intensity LED Lights for Boat, Plane, Cabin, RV", publication date unknown but prior to Mar. 16, 1998.
Article entitled "LED Flashlight", disclosed by R. F. McKeever in Research Disclosure, Mar. 1980, pp. 105 and 106.

* cited by examiner

*Primary Examiner*—Don Wong
*Assistant Examiner*—Thuy Vinh Tran
(74) *Attorney, Agent, or Firm*—Tarolli, Sundheim, Covell, Tummino & Szabo L.L.P.

(57) ABSTRACT

A flashlight includes a source of power, a source of light, and switching circuitry connected with the source of power and the source of light. The source of light may be a semiconductor diode capable of emitting white light when energized. Touch-sensitive switch apparatus includes first and second terminals which are engagable by an operator of the flashlight to increase intensity of light emitted by the semiconductor diode. Third and fourth terminals are engagable by the operator to decrease intensity of the light emitted by the semiconductor diode.

94 Claims, 4 Drawing Sheets

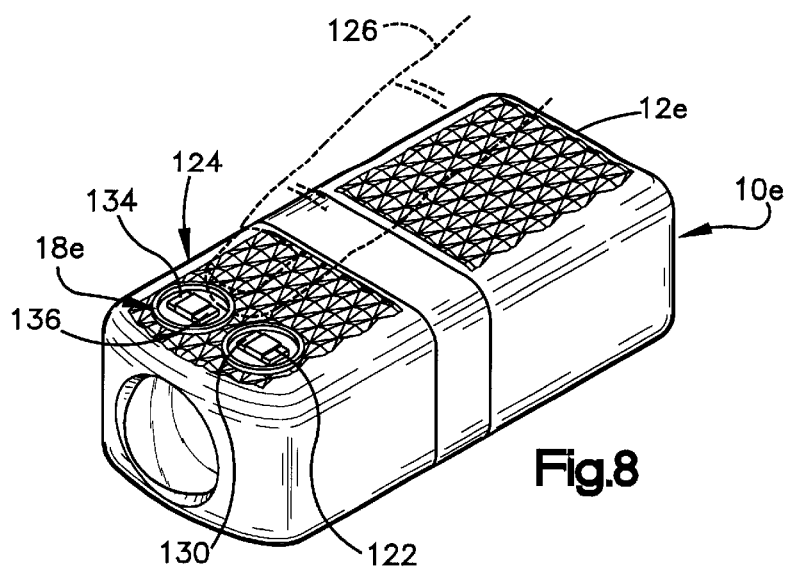
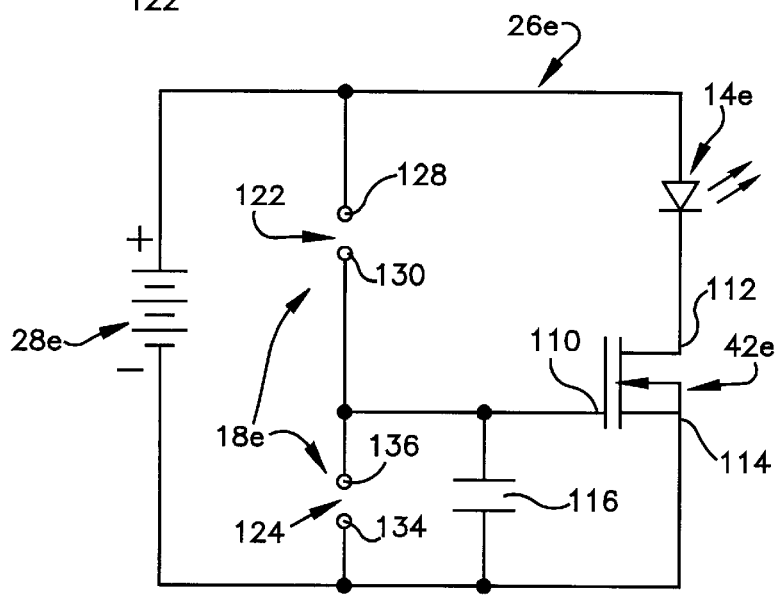
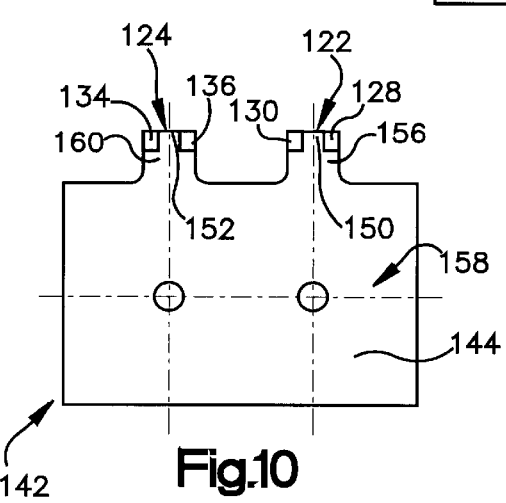

FLASHLIGHT

RELATED APPLICATIONS

This application is a continuation-in-part of U.S. patent application Ser. No. 09/658,142 filed Sep. 8, 2000, now U.S. Pat. No. 6,239,555 B1. The aforementioned U.S. patent application Ser. No. 09/658,142 is itself a division of U.S. patent application Ser. No. 09/268,520 filed Apr. 6, 1999, now U.S. Pat. No. 6,140,776. The benefit of the earlier filing dates of the aforementioned U.S. patent applications is hereby claimed for all subject matter common to this application and the aforementioned U.S. patent applications.

BACKGROUND OF THE INVENTION

The present invention relates to a new and improved flashlight and more specifically to a flashlight which may use a semiconductor diode as a source of light and/or may have a touch-sensitive switch apparatus. It has been suggested that a flashlight may use either a red or green light emitting diode in place of a conventional bulb. When a mechanical switch is actuated, the light emitting diode is energized by a battery in the flashlight. A flashlight having this construction is disclosed in U.S. Pat. No. 4,290,095.

It has previously been suggested that a flashlight could have springs which drive a generator to provide power. The output from the generator is used to energize a conventional light bulb. A flashlight having this construction is disclosed in U.S. Pat. No. 3,099,402.

A flashlight having a light emitting diode which periodically flashes to aid in finding the flashlight in the dark is disclosed in U.S. Pat. No. 4,228,484. The flashlight disclosed in this patent has a battery which energizes a conventional light bulb when a mechanical switch is actuated. The light emitting diode continuously flashes when a battery is disposed in the flashlight.

It has previously been suggested that a touch sensitive switch could be used in association with a wristwatch. A wristwatch having a touch sensitive switch is disclosed in U.S. Pat. No. 4,063,111.

SUMMARY OF THE INVENTION

The present invention provides a new and improved flashlight, that is, a source of illumination which is movable by the person operating the flashlight. The flashlight includes a light source. The light source may be a semiconductor diode which is capable of emitting light when energized. Electrical circuitry interconnects the diode and a source of power which may be a battery or a generator.

One embodiment of the electrical circuitry is associated with a switch which is operable between a first condition and a second condition. When the switch is in the first condition, the light source is energized to provide light of a low intensity to facilitate locating the flashlight. When the switch is in the second condition, the diode is energized to provide light of a high intensity which may be sufficient to illuminate objects spaced more than six feet from the flashlight. The light source may be a diode which emits white light when energized.

The electrical circuitry may be associated with a manually movable switch member. Upon actuation of the manually movable member, a transistor or other semiconductor device is switched between conducting and nonconducting states. The light source, which may be a white light emitting diode, is changed between a condition in which it is energized to emit high intensity light and low intensity light in response to actuation of the transistor between the conducting and nonconducting states.

A regulator may advantageously be connected with the light source and the source of power to maintain the intensity of the light emitted from the diode or other light source substantially constant. When the diode or other light source is energized to provide high intensity light, the regulator is effective to maintain the intensity of the light constant even though the strength of the source of power connected with the diode decreases. This enables light of a uniform intensity to be obtained from the light emitting diode even though a power source which gradually discharges with the passage of time is used to energize the light emitting diode.

The flashlight may have a touch sensitive switch. The electrical circuitry connected with the power source and the light source is operable in response to the touch sensitive switch being touched by the person operating the flashlight. The touch sensitive switch may have terminals which are engagable by a portion of a body of the person operating the flashlight to enable electrical energy to be conducted between the terminals through the body of the person operating the flashlight. A plurality of touch sensitive switches may be provided to increase and decrease intensity of light emitted from the light source. The light source may be energized to provide continuous or intermittent illumination.

There are a plurality of inventive features and embodiments of the invention disclosed herein. The inventive features may be used together or separately. The features of one embodiment of the invention may be used with features of another embodiment of the invention.

BRIEF DESCRIPTION OF THE DRAWINGS

The foregoing and other features of the invention will become more apparent upon a consideration of the following description taken in connection with the accompanying drawings wherein:

FIG. 8 is a pictorial illustration, generally similar to FIG. 7, of another embodiment of a flashlight constructed in accordance with the present invention;

FIG. 9 is a schematicized illustration of one embodiment of electrical circuitry which may be utilized in association with the flashlight of FIGS. 1, 7 and/or 8;

FIG. 10 is a simplified plan view of a circuit board which may be utilized in association with circuitry associated with the flashlights of FIGS. 1, 7 and/or 8.

DESCRIPTION OF THE SPECIFIC PREFERRED EMBODIMENT OF THE INVENTION

General Description

Figure 1:
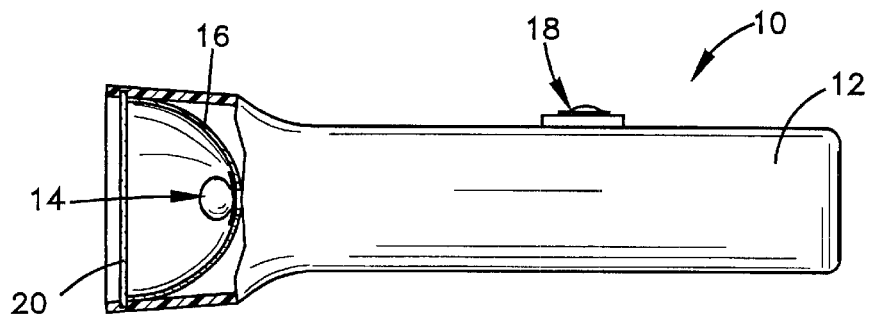
FIG. 1 is a schematic illustration of one embodiment of a flashlight constructed in accordance with the present invention.

A flashlight 10 constructed in accordance with one of the features of the present invention is illustrated in FIG. 1. The flashlight 10 is movable by a person operating the flashlight. The flashlight 10 includes a cylindrical housing 12 which encloses suitable batteries (not shown). A light emitting diode 14 is mounted in a reflector 16 and is electrically connected with the batteries in the housing by a switch apparatus 18. A lens 20 closes one end, that is the left end as viewed in FIG. 1, of the flashlight 10.

Although a flashlight 10 having a cylindrical housing 12 which is gripped manually has been illustrated in FIG. 1, it should be understood that the flashlight could have a different construction. Thus, the flashlight 10 could have a housing 12 with a construction which facilitates an operator positioning the flashlight on a support surface with the light emitting diode 14 and lens 20 facing upward so that the flashlight may function as a lamp. Alternatively, the flashlight 10 could have a housing with a construction corresponding to the construction of a toy so that the light emitting diode 14 is energized to provide light from the toy. Regardless of the configuration which is selected for the housing 12, the flashlight 10 will have a relatively long operating life since the light emitting diode 14, which is utilized as a source of light, requires relatively little power when energized.

In accordance with one of the features of the present invention, the light emitting diode 14 is energizable to emit white light. The white light emitting diode 14 may contain gallium nitrate. Regardless of the composition of the light emitting diode 14, it is effective to emit white light of an intensity which will vary as a function of the magnitude of an electrical current conducted through the light emitting diode 14. It should be understood that light sources other than the light emitting diode 14 could be utilized. For example, a light emitting diode which emits light other than white light could be utilized. Alternatively, an incandescent light source could be utilized.

When a very small amount of current is being conducted through the light emitting diode 14, it is effective to provide white light of a low intensity. The low intensity light is insufficient to illuminate objects spaced three feet or more from the flashlight 10. When a larger current is conducted through the light emitting diode 14, it is effective to emit white light of a relatively high intensity which is capable of illuminating objects at a distance of more than six feet from the flashlight 10.

Figure 2:
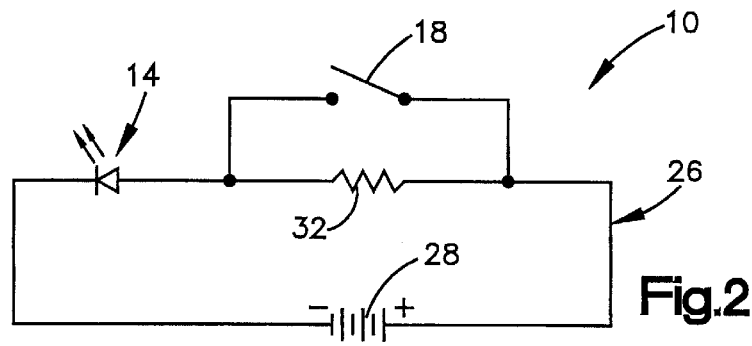
FIG. 2 is a highly schematicized illustration of one embodiment of electrical circuitry which may be used with a light emitting diode in the flashlight of FIG. 1.

Switching circuitry 26 is illustrated in FIG. 2 in association with the light emitting diode 14 and a suitable battery 28. The switching circuitry 26 includes a resistor 32 which is connected in parallel with the switch apparatus 18.

When the switch apparatus 18 is in an open or off condition illustrated in FIG. 2, the light emitting diode 14 is energized to provide white light of a very low intensity. The white light of a low intensity emitted from the light emitting diode 14 when the switch apparatus 18 is in the off condition, facilitates locating the flashlight 10. Thus, when the switch apparatus 18 is in the off or nonconducting condition, the light emitting diode 14 is continuously energized by a relatively small flow of current conducted from the battery 28 through the resistor 32. This small flow of current is effective to energize the light emitting diode to emit white light of very low intensity. Even though the white light emitted by the light emitting diode 14 has a low intensity, it enables the flashlight 10 to be easily located in the dark, for example, in a drawer in an unlighted room.

When the flashlight 10 is to be utilized to illuminate an object, the switch apparatus 18 is operated from the open condition illustrated in FIG. 2 to a closed condition. When the switch apparatus 18 is closed, electrical current is conducted from the battery 28 through the switch apparatus to the light emitting diode 14 at a rate sufficient to energize the light emitting diode to continuously emit white light of a high intensity. The white light of the high intensity emitted by the light emitting diode 14 is sufficient to illuminate objects at a distance of more than six feet from the flashlight 10.

When the switch apparatus 18 (FIG. 2) is in the closed or on condition, the light emitting diode 14 draws current from the battery 28 at a rate which is substantially less than the rate which current would be drawn from the battery by a conventional incandescent light bulb. Therefore, the flashlight 10 can be operated for a relatively long time without discharging the battery 28. When the switch assembly 18 is in the open condition and the light emitting diode 14 is energized to provide low intensity light, the electrical current conducted from the battery 28 is extremely small. This enables the flashlight 10 to remain in the off condition in which the light emitting diode 14 continuously emits low intensity light, for very long periods of time without significantly discharging the battery 28.

In one specific embodiment of the flashlight 10, the battery 28 was a nine volt battery. In this specific embodiment of the invention, the light emitting diode 14 was energized by a current of approximately thirty microamperes when the switch assembly 18 was in the off or open condition. At this time, the light emitting diode 14 was effective to continuously emit white light of a low intensity.

When the switch apparatus 18 was operated to the closed condition, the light emitting diode 14 was effective to emit white light of relatively high intensity. At that time, a current flow of eighty milliamperes was utilized to energize the light emitting diode 14. It should be understood that the foregoing specific current levels have been set forth herein for purposes of clarity of description. It is contemplated that the flashlight 10 could be constructed so as to have current flow levels which are different than these specific current flow levels.

The relatively low current required to energize the flashlight 10 enables the same battery 28 to be used over a very long period of time without replacing the battery. The same light emitting diode 14 is used to emit light of low intensity to facilitate locating the flashlight 10 when the flashlight is turned off and to emit light of high intensity, when the flashlight is turned on. Therefore, the construction of the flashlight is simplified and the number of components reduced.

In the embodiment of the invention illustrated in FIGS. 1 and 2, the diode 14 is continuously energized to emit light of a low intensity when the switch apparatus 18 is in an off or open condition. However, if desired, the switching circuitry 26 could be constructed so as to interrupt all flow of current to the light emitting diode 14 when the switch 18 is in the off condition. If this is done, it may be desired to utilize a three position switch apparatus 18 having a first or off position in which the light emitting diode 14 is de-energized, a second actuated position in which the light emitting diode is energized to emit white light of a low intensity and a third actuated position in which the light emitting diode is energized to emit white light of a high intensity. Alternatively, the switch apparatus could include two switches.

Switching Circuitry

Figure 3:
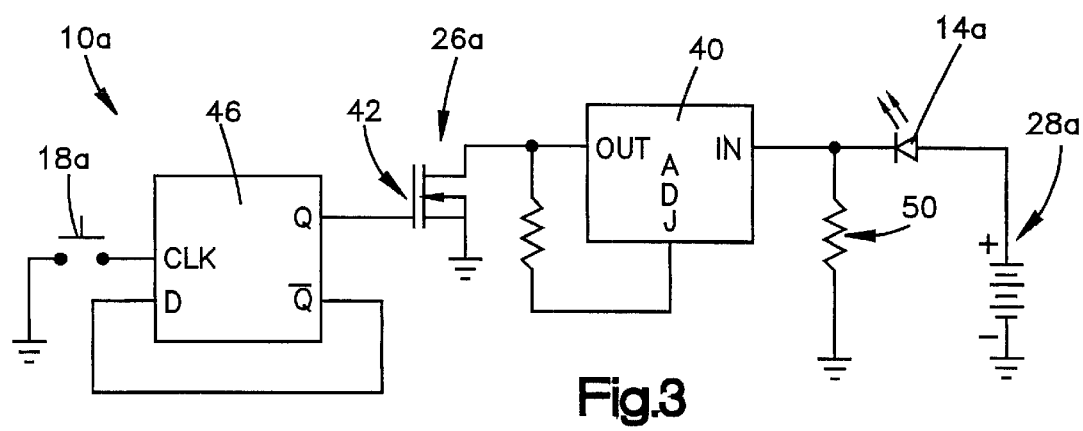
FIG. 3 is a schematic illustration of another embodiment of electrical circuitry which may be used with a light emitting diode in the flashlight of FIG. 1.

In the embodiment of the invention illustrated in FIGS. 1 and 2, a simple mechanical switch apparatus 18 is utilized to control the flow of electrical current between the battery and the light emitting diode. In the embodiment of the invention illustrated in FIG. 3, solid state switching circuitry is utilized to minimize the current required to control operation of the light emitting diode. Since the embodiment of the invention illustrated in FIG. 3 is generally similar to the embodiment of the invention illustrated in FIGS. 1 and 2, similar numerals will be utilized to identify similar components, the suffix letter "a" being associated with the numerals of FIG. 3 to avoid confusion.

A flashlight 10a has switching circuitry 26a which controls the flow of current from a battery 28a through a semiconductor diode 14a which is capable of emitting white light when energized. The intensity of the white light emitted by the diode 14a varies as a function of the magnitude of the current conducted through the diode.

The switching circuitry 26a includes a manually actuatable momentary pushbutton switch apparatus 18a. If desired, the switch apparatus 18a could be of the touch sensitive type. In addition to the pushbutton switch apparatus 18a, the switching circuitry 26a includes an adjustable voltage regulator 40 which is connected with a semiconductor switching device 42.

In the illustrated embodiment of the invention, the voltage regulator 40 is connected with the drain of a metal-oxide-silicon-field-effect transistor (MOSFET) 42. Of course, other known types of semiconductor switching devices could be used in place of the MOSFET 42 if desired. The adjustable voltage regulator 40 is configured as a current regulator with feedback through resistor 50 to provide a desired rate of current flow through when the light emitting diode 14a is energized to emit white light of a high intensity.

An output of a flip/flop 46 is connected with the gate of the transistor 42. The flip/flop 46 is stable in either one of two conditions. The flip/flop 46 is stable in an on condition in which there is a high output signal from the flip/flop to the gate of the field effect transistor 42 to render the transistor conducting. The flip/flop 46 is also stable in an off condition in which there is a low output signal from the flip/flop to the field effect transistor 42 and the transistor is nonconducting.

When the flip/flop is in a condition in which there is a low output signal to the transistor 42, the light emitting diode 14a is energized by a relatively small flow of current from the battery 28a through the resistor 50 to ground. At this time, the light emitting diode 14a continuously emits white light of a low intensity. The low intensity white light from the light emitting diode 14a enables the flashlight 10a to be readily located.

When the flashlight is to be utilized to illuminate an object, the pushbutton switch apparatus 18a is manually depressed and then released. This results in an instantaneous closing of the contacts in the pushbutton switch apparatus 18a. Closing the contacts in the pushbutton switch apparatus 18a toggles the flop/flop 46a from the off condition in which it produces a low output signal, to the on condition in which it produces a high signal to the gate of the transistor 42. The output signal from the flip/flop 46 to the gate of the transistor 42 renders the transistor conducting.

When the transistor 42 is changed from a nonconducting condition to a conducting condition, the rate of flow of current through the light emitting diode 14a increases. This results in white light of a high intensity being emitted from the light emitting diode 14a to illuminate objects. At this time, the white light from the light emitting diode 14a has an intensity sufficient to illuminate objects at a distance of more than six feet from the flashlight 10a. There is a continuous flow of current from the light emitting diode through the voltage regulator 40 to the drain of the transistor 42. The current flows from the source of the transistor 42 to ground.

The light emitting diode 14a remains continuously energized to emit white light of a relatively high intensity until the pushbutton 18a is again actuated. Upon depressing and releasing the pushbutton 18a, the flip/flop 46a toggles from the on condition in which it has high output signal to the off condition in which it has a low output signal. When this occurs, the transistor 42 is rendered nonconducting. This results in the light emitting diode 14a again being energized by a relatively small flow of current through the resistor 50 to ground.

In the embodiment of the invention illustrated in FIG. 3, the diode 14a emits white light of a high intensity when the switching transistor 42 is conducting and emits white light of a low intensity when the switching transistor is nonconducting. It is contemplated that the switching circuitry 26a could have many different constructions. For example, switching transistor 42 and the diode 14a can be changed in places or changed in their polarities. If desired, the switching transistor 42 could be switched between the conducting and nonconducting conditions in response to a signal from a source other than the flip/flop 46.

Switching Circuitry—Second Embodiment

Figure 4:
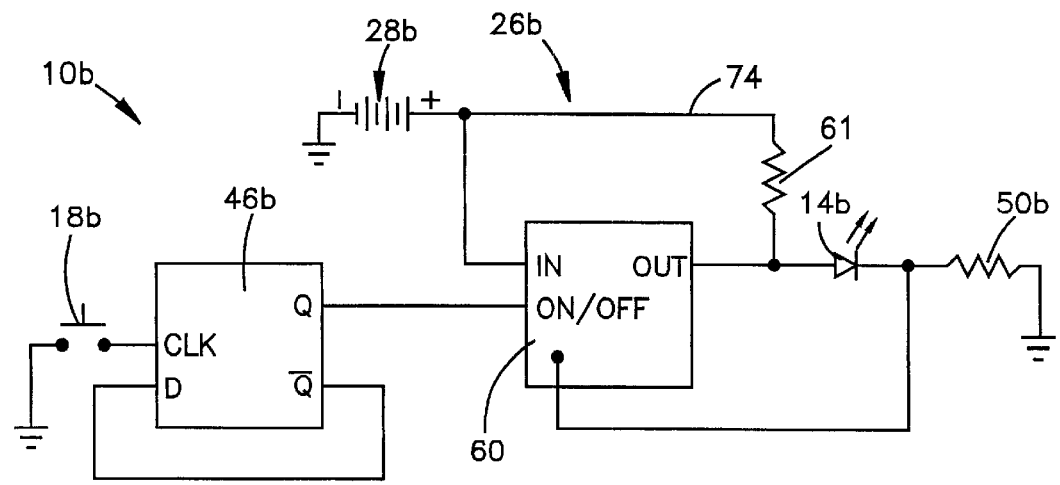
FIG. 4 is a schematic illustration of another embodiment of electrical circuitry which may be used with a light emitting diode in the flashlight of FIG. 1.
Figure 5:
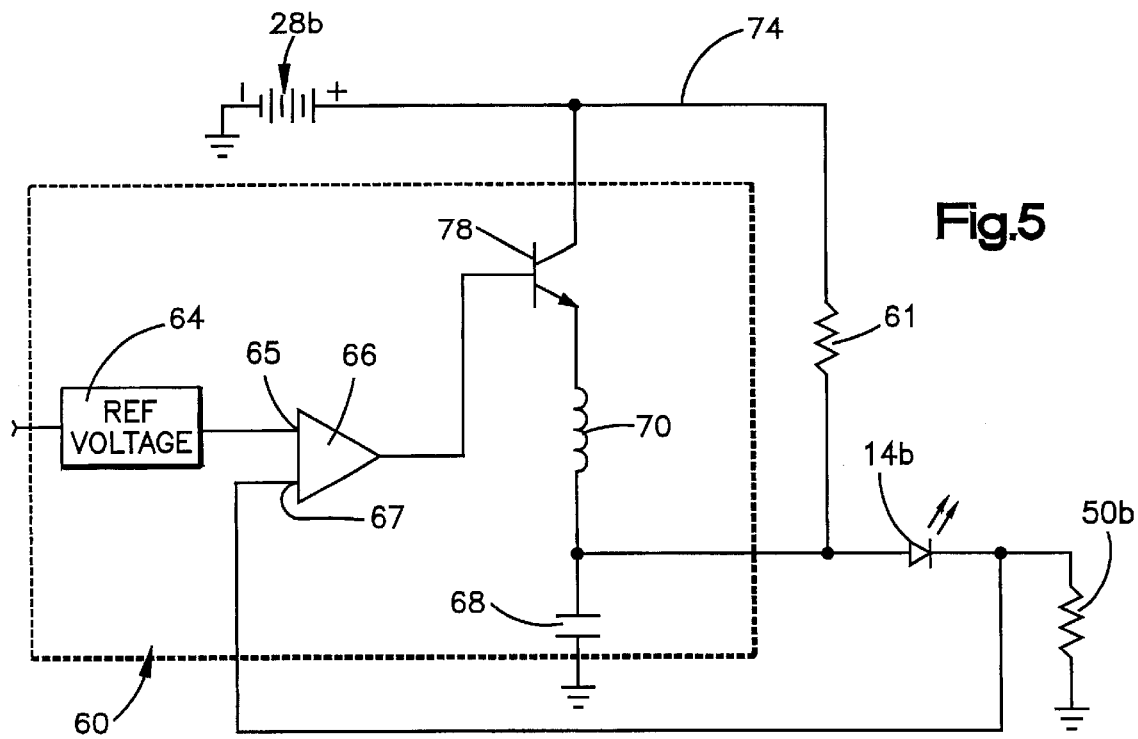
FIG. 5 is a schematic illustration of regulator circuitry which is part of the electrical circuitry of FIG. 4.

In the embodiment of the invention illustrated in FIG. 3, there is a continuous flow of a relatively small amount of current from the battery 28a when the light emitting diode is energized to emit white light of a low intensity and a continuous flow of current at a greater rate from the battery when the light emitting diode is energized to emit white light of a high intensity. In the embodiment of the invention illustrated in FIGS. 4 and 5, the flow of current from the battery is varied to maintain a constant rate of flow of current through the light emitting diode as the strength of the battery decreases. Since the embodiment of the invention illustrated in FIGS. 4 and 5 is generally similar to the embodiment of the invention illustrated in FIGS. 1–3, similar numerals will be utilized to designate similar components, the suffix letter "b" being associated with the numerals of FIGS. 4 and 5 to avoid confusion.

A flashlight 10b (FIG. 4) has a battery 28b which functions as a source of power for a light emitting diode 14b. When the light emitting diode 14b is energized by a relatively small flow of current, the diode is effective to produce white light at a relatively low intensity. When the light emitting diode 14b is energized by a larger flow of current, the diode is effective to produce white light of a relatively high intensity. The high intensity white light is capable of illuminating objects at a distance of six feet or more from the flashlight.

The flow of current through the flashlight 10b is controlled by switching circuitry 26b. The switching circuitry 26b includes a manually actuated momentary pushbutton 18b. The switching circuitry 26b also includes a switching regulator 60 and a flip/flop 46b. The regulator 60 is effective to store electrical energy and to discharge the stored electrical energy to maintain the intensity of the white light emitted from the diode 14b constant at either a low intensity or a high intensity as the strength of the battery 28b decreases. This enables the flashlight 10b to provide light of a desired intensity, that is either a low intensity or a high intensity, as the strength of the battery decreases. Of course, this increases the operating life of the battery 28b.

When there is a low output signal from the flip/flop 46b, the flow of current through the switching regulator 60 is interrupted. At this time, there will be a relatively small flow of current from the battery 28b through a resistor 61, the light emitting diode 14b, and resistor 50b to ground. This relatively small flow of current is effective to energize the light emitting diode 14b to provide white light of low intensity. The low intensity white light enables the flashlight 10b to be readily located.

When the flashlight 10b is to be switched from emitting light of low intensity to emitting light of high intensity, the pushbutton switch apparatus 18b is actuated. When the pushbutton 18b is depressed and then released, the condition of the flip/flop 46b changes from a low output signal to high output signal to the regulator 60. In response to this output signal, the regulator 60 enables a relatively high flow of current to be conducted from the battery 26b through the switching regulator to the white light emitting diode 14b. At this time, the light emitting diode 14b is effective to provide white light of high intensity, that is an intensity sufficient to illuminate an object more than six feet from the flashlight 10b.

The construction of the regulator 60 is illustrated schematically in FIG. 5. The regulator 60 includes a reference voltage source 64 which is connected to an input terminal 65 of a comparator 66. The other terminal 67 of the comparator 66 is connected with a capacitor 68 and an inductor 70. Lead 74 connects the switching regulator 60 with the battery 28b.

When the voltage at the inductor 70 and capacitor 68 is less than the reference voltage, the high output signal from the comparator 66 is conducted to a transistor 78 to render the transistor conducting. When this occurs, current from the battery 28b is conducted from the input lead 74 to the transistor 78, inductor 70 and capacitor 68 to ground. This results in the capacitor 68 and coil 70 being charged until the voltage at the terminal 67 of the comparator is more than the reference voltage. When this occurs, the low output signal from the comparator forces the transistor 78 to be rendered nonconducting. At this time, electrical energy is discharged from the inductor 70 and capacitor 68 to the light emitting diode 14b.

When the battery 28b is relatively strong, the length of time required to charge the inductor 70 and capacitor 68 is relatively short. However, as the strength of the battery 28b gradually decreases, the length of time required to charge the inductor 70 and capacitor 68 increases. When the battery 28b is discharged to a level which is just slightly less than the reference voltage 64, the transistor 78 is continuously maintained in a conducting condition so that the light emitting diode 14b is energized by the battery 28b. This enables the battery 28b to be utilized to energize the light emitting diode 14b as the strength of the battery 28b decreases.

Flashlight—Generator

In the embodiments of the invention illustrated in FIGS. 1–5, a battery 28 is utilized as the power source for the flashlight 10. In the embodiment of the invention illustrated in FIG. 6, a coil spring is utilized to store energy to drive a generator which provides power to energize a light emitting diode. Since the embodiment of the invention illustrated in FIG. 6 Is generally similar to the embodiment illustrated in FIGS. 1–5, similar numerals have been utilized to designate similar components, the suffix letter "c" being associated with the embodiment of the invention illustrated in FIG. 6 to avoid confusion.

A flashlight 10c includes a housing 12c which encloses a reflector 16c and a light emitting diode 14c. A manually actuatable switch 18c is operable to effect operation of switching circuitry (not shown) having the same construction as the switching circuitry 26a of FIG. 3. When the switching circuitry connected with the switch 18c is in an off condition, the light emitting diode 14c is energized by a relatively small current to emit white light of a low intensity. When the switch 18c is actuated to effect operation of the switching circuitry to an on condition, the light emitting diode 14c is energized by a relatively large flow of current to emit white light of a high intensity.

In accordance with a feature of this embodiment of the invention, power for energizing the light emitting diode 14c is obtained from a generator 88 which is driven by a coil spring 90. A manually actuatable input member 92 is rotatable to effect operation of a gear mechanism 94 to resiliently deflect the coil spring 90. The coil spring 90 powers the generator 88 through a gear mechanism to provide electrical energy for energizing the light emitting diode 14c.

Figure 6:
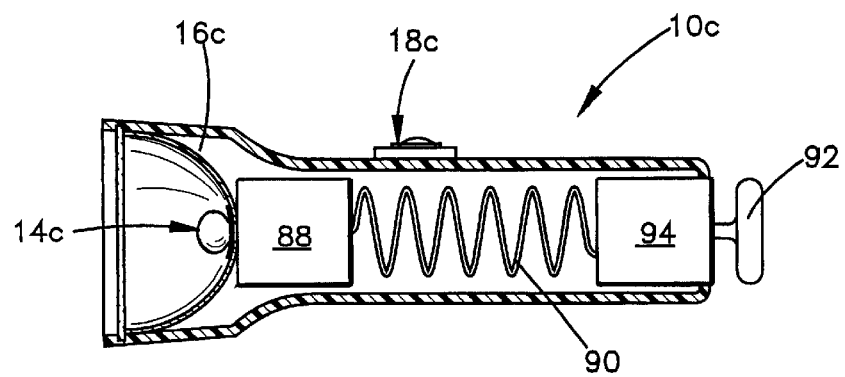
FIG. 6 is a schematic illustration of a flashlight having a light emitting diode which is energized by a spring driven generator.

It should be understood that the relationship between the gear drive 94, coil spring 90 and generator 88 has been indicated schematically in FIG. 6. It is contemplated that the coil spring, gear mechanism 94 and generator 88 may have any one of many known constructions. Specifically, it is contemplated that the gear mechanism 94, coil spring 90 and generator 88 could be interconnected in the same manner as is disclosed in U.S. Pat. No. 2,105,719. Alternatively, the gear mechanism 94, coil spring 90 and generator 88 could be interconnected in the manner disclosed in U.S. Pat. No. 3,099,402. The disclosures from the aforementioned U.S. Pat. Nos. 2,105,719 and 3,099,402 are incorporated herein in their entirety by this reference thereto. However, it should be understood that the gear mechanism 94, coil spring 90 and generator 88 could have any one of many constructions and it is not intended to limit the present invention to any specific construction of the gear mechanism, coil spring and generator.

Flashlight—Second Embodiment

In the embodiment of the invention illustrated in FIGS. 1 and 6, the flashlight 10 has a generally cylindrical housing. In the embodiment of the invention illustrated in FIG. 7, the flashlight has a generally rectangular housing. Since the embodiment of the invention illustrated in FIG. 7 is generally similar to the embodiments of the invention illustrated in FIGS. 1–5, similar numerals will be utilized to designate similar components, the suffix letter "d" being associated being associated with the numerals of FIG. 7 to avoid confusion.

A flashlight 10d (FIG. 7) has a generally rectangular housing 12d. A momentary switch apparatus 18d is mounted on a major side wall 100 of the rectangular housing 12d. A lens 20d is disposed in a minor side wall 102 of the housing 12d. A battery and electronic circuitry corresponding to the electronic circuitry of FIGS. 4 and 5, are enclosed within the housing 12d. In the embodiment of the invention illustrated in FIG. 7, the switch assembly 18d may be actuated to switch a light emitting diode (not shown but corresponding to the light emitting diode 14 of FIGS. 1–5), between an off condition, an on condition in which the diode emits low intensity white light, an on condition in which the diode emits high intensity white light, and an on condition in which the diode is intermittently energized to emit a flashing light. The flashing light, that is, an intermittent light, is obtained by providing a timing circuit in conjunction with the circuitry of FIGS. 3 and 5.

Figure 7:
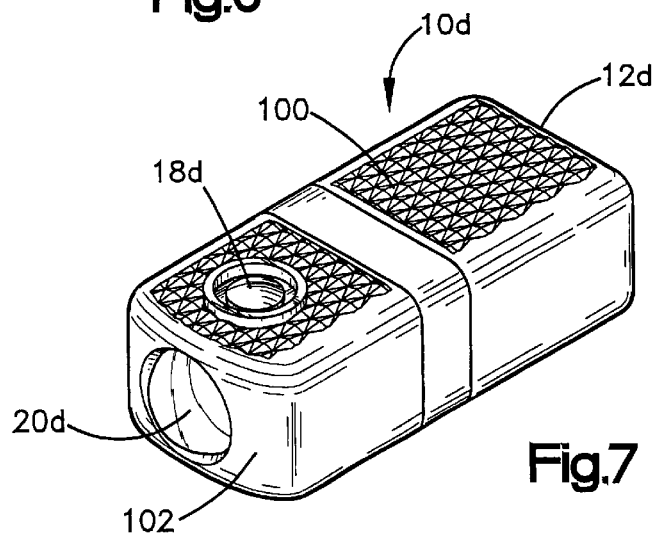
FIG. 7 is a pictorial illustration of a flashlight which may include the electrical circuitry of FIGS. 3, 4 and/or 5.

Although the flashlight 10d has been illustrated in FIG. 7 as having a rectangular housing, it is contemplated that the flashlight could have a housing with any desired construction. It should be understood that the invention in this application is not to be limited to a flashlight having a housing with any particular construction.

Flashlight—Third Embodiment

A flashlight 10e constructed in accordance with one of the features of the present invention is illustrated in FIG. 8. The flashlight 10e is movable by a person operating the flashlight. The flashlight 10e includes a generally rectangular housing 12e which encloses suitable batteries 28e (FIG. 9).

A light emitting diode 14e is mounted in a reflector and is electrically connected with the batteries 28e by a switch apparatus 18e. Although it is preferred to use the light emitting diode 14e as a light source, a different light source could be provided. For example, the light source 14e could be an incandescent light source.

Although the flashlight 10e has a generally rectangular housing 12e (FIG. 8) which is gripped manually, it should be understood that the flashlight 10e could have a different construction. Thus, the flashlight 10e could have a housing 12e with a construction which facilitates an operator positioning the flashlight on a support surface with the light emitting diode 14e and associated lens facing upward so that the flashlight may function as a lamp. Alternatively, the flashlight 10e could have a construction corresponding to the construction of a toy so that a light emitting diode 14e is energized to provide light from the toy. Regardless of the configuration which is selected for the housing 12e, the flashlight 10e will have a relatively long operating life since the light emitting diode 14e, which is utilized as a source of light, requires relatively little power when energized.

In accordance with one of the features of the present invention, the semiconductor diode 14e is energizable to emit white light. The white light emitting diode 14e may contain gallium nitrate. Regardless of the composition of the semiconductor diode 14e, it is effective to emit white light of an intensity which will vary as a function of the magnitude of an electrical current conducted through the light emitting diode 14e. It should be understood that light sources other than the light emitting diode 14e could be utilized. For example, a light emitting diode which emits light other than white light could be utilized. Alternatively, an incandescent light source could be utilized.

When a small amount of current is being conducted through the light emitting diode 14e, it is effective to provide white light of a low intensity. The low intensity light is insufficient to illuminate objects spaced three feet or more from the flashlight 10e. When a larger current is conducted through the light emitting diode 14e, it is effective to emit white light of a relatively high intensity which is capable of illuminating objects at a distance of more than six feet from the flashlight 10e.

Switching circuitry 26e is illustrated in FIG. 9 in association with the light emitting diode 14e and the battery 28e. The switching circuitry 26e includes the switch apparatus 18e which is constructed in accordance with one of the features of the present invention. The switch apparatus 18e is connected with a gate 110 of a metal-oxide-silicone-field-effect transistor (MOSFET) 42e. Of course, other known types of semiconductor switching devices could be used in place of the MOSFET 42e if desired.

An adjustable voltage regulator, similar to the voltage regulator 60 of FIG. 4, may be provided in the switching circuitry 26e. If an adjustable voltage regulator is utilized in the switching circuitry 26e, the adjustable voltage regulator would provide a desired rate of current flow when the light emitting diode 14e is energized to emit white light of a high intensity, in the same manner as previously discussed in conjunction with the embodiments of the invention illustrated in FIGS. 3–5.

The light emitting diode 14e is connected with the drain 112 of the field effect transistor 42e. The source 114 of the field effect transistor 42e is connected with the battery 28e. A capacitor 116 is provided to maintain the light emitted by the semiconductor diode 14e at a desired intensity. Since the input impedance to the gate 110 of the field effect transistor 42e is extremely high and the leakage resistance of the capacitor 116 is also extremely high, a charge on the capacitor can remain there for several hours or even days. Therefore, the capacitor 116 can function as a memory device to control the intensity of the illumination provided by the light emitting diode 14e.

In accordance with one of the features of this embodiment of the invention, the switch apparatus 18e is of the touch-sensitive type. The switch apparatus 18e includes an on or brighter touch-sensitive switch 122 and an off or dimmer touch-sensitive switch 124. Although one particular type of touch-sensitive switch apparatus is disclosed herein, a different type of touch-sensitive switch apparatus could be utilized if desired.

When the intensity of white light emitted from the semiconductor diode 14e is to be increased, a portion of a body, such as a finger 126 of a person operating the flashlight 10e, is positioned in engagement with terminals 128 and 130 of the brighter touch-sensitive switch 122. The finger 126 or other portion of a body of a person operating the flashlight 10 bridges the two terminals 128 and 130 and provides a conductor between the two terminals 128 and 130. When the two terminals 128 and 130 are interconnected through the resistive conductor provided by the finger 126 or other portion of the body of an operator, the capacitor 116 and gate 110 of the field effect transistor 42e are connected with the positive side of the battery 28e. This results in the field effect transistor 42e having greater conductivity. This increases the current flowing through the semiconductor diode 14e with a resulting increase in the intensity of the white light emitted by the diode. At the same time, the charge on the capacitor 116 is increased.

The off or dimmer touch-sensitive switch 124 (FIG. 9) includes terminals 134 and 136. When the intensity of the white light emitted from the semiconductor diode 14e is to be decreased, the finger 126 or other portion of the body of a person operating the flashlight 10e is positioned across the terminals 134 and 136. By bridging the terminals 134 and 136 with the finger 126, a resistive conductor is provided to connect the gate 110 of the field effect transistor 42e with the negative side of the battery 28e. This results in the conductivity of the field effect transistor 42e being decreased with a resulting decrease in the intensity of the white light emitted from the semiconductor diode 14e. At the same time, the magnitude of the charge on the capacitor 116 is decreased.

The capacitor 116 maintains the gate 110 of the field effect transistor 42e at a level which is determined by actuation of the brighter touch-sensitive switch 122 and/or the dimmer touch-sensitive switch 124. A person operating the flashlight 10e can sequentially actuate the brighter touch-sensitive switch 122 and the dimmer touch-sensitive switch 124 to obtain the desired intensity of illumination from the white light emitting semiconductor diode 14e. As this is done, the charge on the capacitor 116 is varied.

Once the desired intensity of the illumination emitted by the semiconductor diode 14e (FIG. 9) has been obtained, the brighter touch-sensitive switch 122 and dimmer touch-sensitive switch 124 are no longer actuated by the finger 126 of the user of the flashlight 10e. The charge on the capacitor 116 then remains constant so that the electrical potential at the gate 110 of the field effect transistor 42e remains constant. This results in the conductivity of the field effect transistor 42e remaining constant. Since the conductivity of the field effect transistor 42e remains constant, the intensity of the white light emitted by the semiconductor diode 14e remains constant.

The degree of energization of the light emitting diode 14e can be varied between a de-energized condition in which the light emitting diode is ineffective to emit light and a maximum energized condition in which the light emitting diode is effective to emit light of maximum intensity. The extent of energization of the light emitting diode 14e can be varied through a range which extends between the de-energized condition and the maximum energized condition. This enables the intensity of the light emitted from the light emitting diode to be varied in a range between zero intensity (off) and maximum intensity. The intensity of the light emitted from the diode 14e is varied by actuation of the brighter touch-sensitive switch 122 and/or the dimmer touch-sensitive switch 124.

In accordance with one of the features of the present invention, the terminals 128 and 130 of the brighter touch-sensitive switch 122 are mounted on a circuit board 142 (FIG. 10). Similarly, the terminals 134 and 136 of the dimmer touch-sensitive switch 124 are mounted on the circuit board 142. The circuit board 142 has flat parallel major side surfaces 144 on which components of the switching circuitry 26e are mounted in a known manner. Thus, the light emitting diode 14e, field effect transistor 42e, and capacitor 116 are all mounted on a major side surface 144 of the circuit board 142. The circuit board 142 is connected with the positive and negative terminals of the battery 28e.

The terminals 128 and 130 of the brighter touch-sensitive switch 122 and the terminals 134 and 136 of the dimmer touch-sensitive switch 124 are at least partially disposed on minor side surfaces 150 and 152 of the circuit board 142. Parallel major side surfaces 144 of the circuit board 142 are interconnected by minor side surfaces which extend perpendicular to the major side surfaces. However, it should be understood that the terminals 128, 130, 134 and 136 could be mounted at a location other than on the minor side surfaces of the circuit board 142. For example, the terminals 128, 130, 134 and 136 could be mounted on the polymeric material of the housing 10e (FIG. 8).

In the embodiment of the circuit board 142 illustrated in FIG. 10, the terminals 128 and 130 of the brighter touch-sensitive switch 122 are disposed on a projection 156 from a main section 158 of the circuit board 142. Similarly, the terminals 134 and 136 of the dimmer touch-sensitive switch 124 are disposed on a projection 160 from the main section 158 of the circuit board 142. The projections 156 and 160 of the circuit board 142 extends through polymeric material forming the housing 12e (FIG. 8) of the flashlight 10e. This results in the terminals 128, 130 of the brighter touch-sensitive switch 122 and the terminals 134 and 136 of the dimmer touch-sensitive switch 124 being exposed at locations where the projections 156 and 160 extend through the polymeric material forming the housing 12e. Joints between the projections 156 and 160 and the housing 12e of the flashlight 10e are sealed with a suitable adhesive material which interconnects the polymeric material of the housing 12e and the material of the circuit board 142. The seal prevents leakage of liquid and other contaminants in the environment around the flashlight 10e from entering the housing 12e. If desired, the seal between the housing 12e and circuit board 142 could be established by having the polymeric material of the housing self-sealingly engage the projections 156 and 160 on the circuit board 142.

In the illustrated embodiment of the invention, the touch-sensitive switches 122 and 124 each include a pair of terminals, that is, terminals 128 and 130 of the touch-sensitive switch 122 and terminals 134 and 136 of the touch-sensitive switch 124. However, it is contemplated that the touch-sensitive switches 122 and 124 and related switching circuitry 26e could be constructed so that each touch-sensitive switch has only a single terminal. Engagement of the single terminal would be effective to alter the electrical potential at the terminal to effect operation of the associated switching circuitry. For example, the touch-sensitive switches 122 and 124 and associated switching circuitry 26e could be constructed in a manner similar to the disclosure in U.S. Pat. No. 3,805,096.

It is contemplated that the flashlight 10e will initially be in an off condition in which the semiconductor diode 14e is not energized and is ineffective to provide illumination. When the flashlight 10e is to be turned on, a finger 126 or other portion of a body of a person operating the flashlight is positioned in engagement with the terminals 128 and 130 of the on or brighter touch-sensitive switch 122. This is accomplished by pressing the finger 126 of the operator against the outside of the housing 12e at the location where the terminals 128 and 130 are exposed (FIG. 8).

The finger 126 of the person operating the flashlight 10e provides a resistive conductor between the terminals 128 and 130. This results in the electrical potential at the gate 110 (FIG. 9) of the field effect transistor 42e and at one side of the capacitor 116 being increased. As this occurs, the field effect transistor 42e enables electrical energy to be conducted through the semiconductor diode 14e.

As the semiconductor diode 14e is energized, white light is emitted from the diode. The longer the finger 126 of the person operating the flashlight 10e is maintained across the terminals 128 and 130, the greater the intensity of the illumination emitted by the diode 14e. If the finger 126 of the person operating the flashlight 10e is maintained in engagement with the terminals 128 and 130 for a sufficient length of time, the electrical potential at the field effect transistor 42e reaches a maximum and the intensity of the white light emitted from the light emitting diode 14e reaches a maximum.

When the intensity of the white light emitted by the semiconductor diode 14e is at a desired level, the finger 126 of the person operating the flashlight 10e is disengaged from the terminals 128 and 130. When this occurs, the charge on the capacitor 116 maintains the electrical potential at the gate 110 of the field effect transistor 42e constant. Therefore, the intensity of the white light emitted by the semiconductor diode 14e remains constant.

If the intensity of the white light emitted by the semiconductor diode 14e is to be reduced, the finger 126 of the person operating the flashlight 10e is positioned in engagement with the terminals 134 and 136 of the dimmer touch-sensitive switch 124. This results in the capacitor 116 being discharged through the negative side of the battery 28e. As this occurs, the electrical potential at the gate 110 of the field effect transistor 42e is reduced.

Reducing the electrical potential at the gate 110 of the field effect transistor 42e reduces the conductivity of the field effect transistor. There is a resulting decrease in the flow of electrical current through the light emitting diode 14e. As the flow of electrical current through the light emitting diode 14e decreases, the intensity of the illumination emitted from the diode 14e decreases. The capacitor 116 can be discharged to such an extent so that the field effect transistor 42e is no longer conducting and the light emitting diode 14e is turned off, that is, there is no light emitted from the diode 14e.

It is contemplated that it may be desired to have the light emitting diode 14e emit white light of a relatively low intensity to facilitate finding the flashlight 10e when it is turned off. The low intensity light emitted by the semiconductor diode 14e would be insufficient to illuminate objects spaced three feet or more from the flashlight 10e. However, the illumination would be sufficient to enable the flashlight 10e to be easily located in the dark, for example, in a drawer in an unlighted room. This low level of illumination may be obtained by connecting the cathode terminal of the semiconductor diode 14e to ground through a resistor which is effective to restrict current flow to a level corresponding to the desired low light intensity.

When the flashlight 10e is to be subsequently utilized, an operator of the flashlight actuates the brighter touch-sensitive switch 122 by bridging the space between the terminals 128 and 130. This results in the conductivity of the field effect transistor 42e being increased. As the conductivity of the field effect transistor 42e increases, the intensity of the white light emitted from the diode 14e increases.

When the intensity of the light emitted by the diode 14e is to be increased, the finger 126 or other portion of the body of an operator of the flashlight toe is again placed in engagement with the terminals 128 and 130 of the brighter touch-sensitive switch 122. The resulting increase in the electrical potential at the gate 110 of the field effect transistor 42e results in an increase in the intensity of the light emitted from the diode 14e. The level of illumination provided by the diode 14e may be maintained at any desired level by disengaging the terminals 128 and 130 of the brighter touch-sensitive switch 122 when the desired level of illumination is present. This results in the electrical potential at the gate 110 of the field effect transistor 42e being maintained constant, by the capacitor 116, at a level corresponding to the desired level of illumination from the light emitting diode 14e.

Alternative Switching Circuitry

Figure 11:
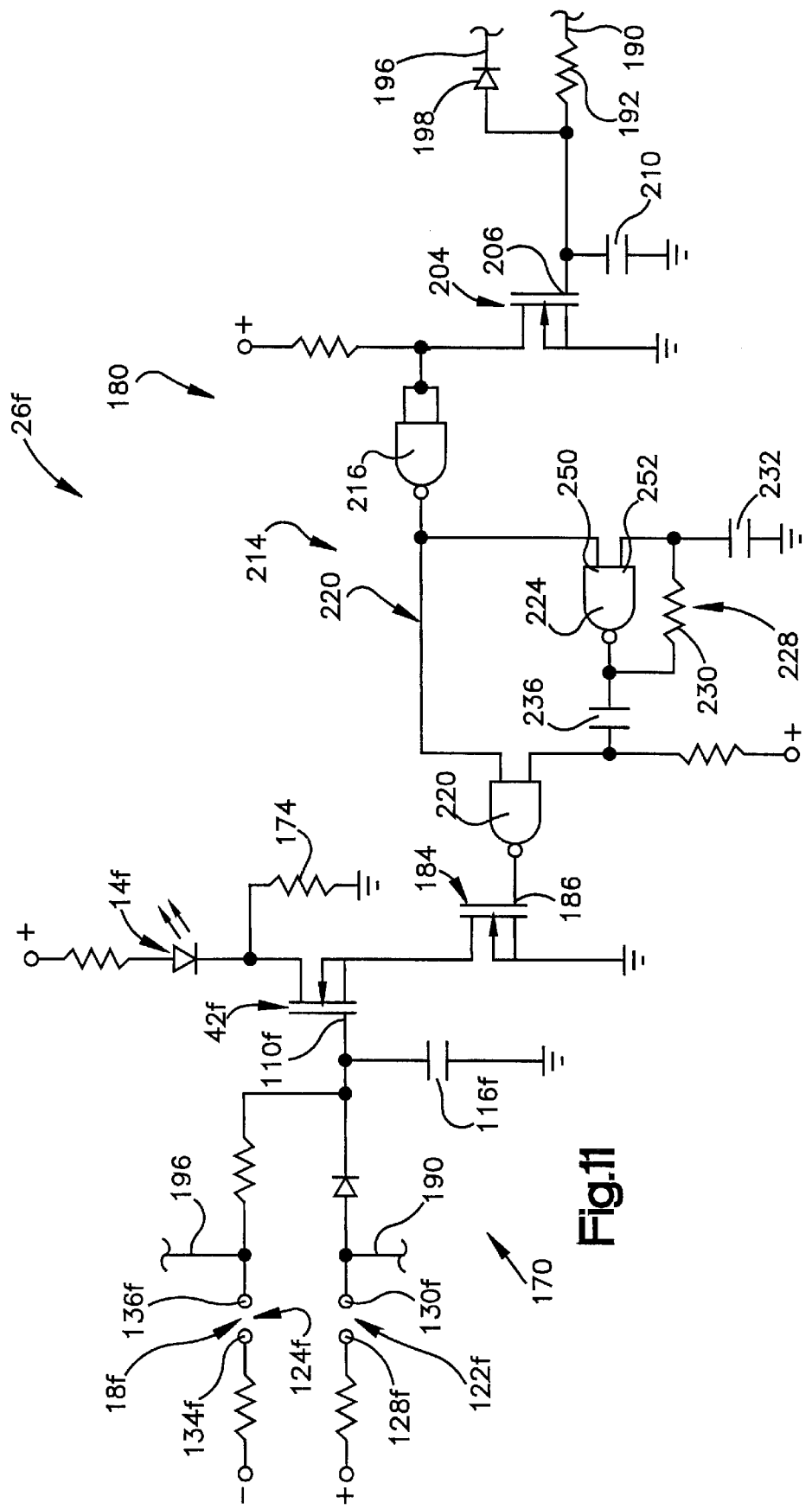
FIG. 11 is a schematicized illustration of another embodiment of electrical circuitry which may be utilized in association with the flashlight of FIGS. 1, 7 and/or 8.

Alternative switching circuitry for the flashlight 10e is illustrated in FIG. 11. Since the switching circuitry of FIG. 11 is generally similar to the switching circuitry of FIG. 9, similar numerals will be utilized to designate similar components, the suffix letter "f" being associated with the components of FIG. 11 to avoid confusion.

Switching circuitry 26f (FIG. 11) is utilized with a flashlight having a housing with the same construction as the housing 12e of the flashlight 10e (FIG. 8). The switching circuitry 26f (FIG. 11) includes a semiconductor diode 14f which emits white light when energized.

Switch apparatus 18f is provided in main control circuitry 170 to control the intensity of illumination emitted by the semiconductor diode 14f. The switch apparatus 18f includes an on or brighter touch-sensitive switch 122f and an off or dimmer touch-sensitive switch 124f. The brighter touch-sensitive switch 122f is connected with the positive side of a battery. The dimmer touch-sensitive switch 124f is connected with the negative side of the battery.

The on or brighter touch-sensitive switch 122f includes terminals 128f and 130f. The off or dimmer touch-sensitive switch 124f includes terminals 134f and 136f. The terminals 128f and 130f of the brighter touch-sensitive switch 122f are interconnected through a portion of an operator's body, such as the finger 126 of FIG. 8, in the same manner as previously described in conjunction with the switching circuitry 26e of FIG. 9. Similarly, the terminals 134f and 136f are interconnected through a portion of an operator's body in the manner previously discussed in conjunction with FIG. 9.

When the intensity of the white light illumination provided by the light emitting diode 14f is to be increased, a portion of an operator's body bridges the terminals 128f and 130f to increase the electrical potential at the gate 110f of a field effect transistor 42f. At the same time, a charge on a capacitor 116f is increased. The charge on the capacitor 116f is effective to maintain the conductivity of the field effect transistor 42f at a level corresponding to a desired magnitude of white light illumination from the light emitting diode 14f.

In the embodiment of the switching circuitry 26f illustrated in FIG. 11, there is always a minimum level of illumination provided by the light emitting diode 14f. This is because the light emitting diode 14f is constantly connected with ground, that is, the negative side of a battery corresponding to the battery 28e of FIG. 9, through a resistor 174.

The resistor 174 limits the flow of current through the light emitting diode to a minimum flow which is effective to cause the light emitting diode to emit white light of an intensity which is insufficient to illuminate an object at a distance of three feet from the light emitting diode. However, this very low level of illumination is sufficient to enable the flashlight with which the switching circuitry 26f is associated, that is, a flashlight similar to the flashlight 10e of FIG. 8, to be located in the dark. If desired, a resistor, corresponding to the resistor 174, could be provided in association with the switching circuitry 26e of FIG. 9 so that the light emitting diode 14e would always be effective to emit at least a predetermined minimum level of illumination.

Intermittent or strobe circuitry 180 is connected with the main control circuitry 170 through a field effect transistor 184. The field effect transistor 184 is normally biased to a conducting condition by an electrical potential at a gate 186 of the field effect transistor 184. Therefore, operation of the brighter touch-sensitive switch 122f or the dimmer touch-sensitive switch 124f is effective to vary the intensity of the illumination emitted from the diode 14f. The diode 14f is energized by a flow of electrical current through both the field effect transistor 42f and the field effect transistor 184.

The brighter touch-sensitive switch 122f is connected with the strobe circuitry 180 through a lead 190. The lead 190 is connected with the right (as viewed in FIG. 11) end of the strobe circuitry 180 through a resistor 192. Similarly, the dimmer touch-sensitive switch 124f is connected with the strobe circuitry 180 through a lead 196. The lead 196 is connected with the right (as viewed in FIG. 11) end of the strobe circuitry 180 through a diode 198.

A field effect transistor 204 has a terminal 206 which is connected with the leads 190 and 196. Therefore, actuation of either the brighter touch-sensitive switch 122f or dimmer touch-sensitive switch 124f is effective to vary the electrical potential conducted to the gate 206 of the field effect transistor 204 in the same manner as in which the electrical potential conducted to the gate 110f of the field effect transistor 42f is varied.

A capacitor 210 is connected with the gate 206 of the field effect transistor 204 in the same manner as in which the capacitor 116f is connected with the gate 110f of the field effect transistor 42f. The capacitor 210 is effective to maintain the electrical potential at the gate 206 of the field effect transistor 204 constant upon interruption of actuation of either the brighter touch switch 122f or the dimmer touch switch 124f. The capacitor 210 charges slower than the capacitor 116f. Therefore, the capacitor 116f will reach its fully charged condition before the capacitor 210 becomes fully charged.

The characteristics of the capacitor 210 are such that the field effect transistor 204 remains in a nonconducting condition until after the capacitor 116 will have become fully charged. When the capacitor 116 becomes fully charged, the light emitting diode 14f has been energized by a flow of electrical current which is sufficient to cause the light emitting diode 14f to emit white light of a maximum intensity. The slower charging rate of capacitor 210 causes the field effect transistor 204 to remain in a nonconducting condition until after the brighter touch-sensitive switch 122f has been actuated for a sufficient length of time to fully charge the capacitor 116f and to cause the light emitting diode 14f to emit constant illumination of a maximum brightness.

If the on or brighter touch-sensitive switch 122f is engaged by a portion of the body of the operator of the flashlight for a period of time after the white light emitted from the light emitting diode 14f has reached a maximum intensity, the capacitor 210 will become fully charged. When this occurs, the electrical potential at the gate 206 becomes sufficient to cause the field effect transistor 204 to become conducting. During the time in which the intensity of the illumination from the light emitting diode 14f is increasing to a maximum intensity, the field effect transistor 204 remains nonconducting. It is only after the light emitting diode 14f has been energized to provide white light of a maximum intensity for a period of time during which the finger or other portion of the body of the operator of the flashlight is maintained on the brighter touch-sensitive switch 122f that the field effect transistor 204 changes from a nonconducting condition to a conducting condition.

Logic circuitry 214 connects the field effect transistor 204 with the field effect transistor 184 and the main control circuitry 170. The logic circuitry 214 includes a NAND gate 216. Both terminals of the NAND gate 216 are connected with the positive or high potential terminal of a battery. Therefore, before the field effect transistor 204 becomes conducting, there is a constant low or negative output from the NAND gate 216.

The output from the NAND gate 216 is connected to an input terminal of a second NAND gate 220. In addition, the output of the NAND gate 216 is connected with the input of the a third NAND gate 224. An RC-timing circuit 228 functions as an oscillator and is connected with the output of the NAND gate 224 and with a second input terminal of the NAND gate 224. The timing circuit 228 includes a resistance 230 and a capacitor 232.

A coupling capacitor 236 connects the output of the NAND gate 224 with an input terminal to the NAND gate 220. The characteristics of the coupling capacitor 236 are such that it has no effect on the transmission of the output from the NAND gate 224 to the NAND gate 220. The output from the NAND gate 220 is connected with the gate 186 of the field effect transistor 184.

Before the field effect transistor 204 becomes conducting, the output of the NAND gate 216 is constantly low or negative. This results in the outputs of NAND gates 220 and 224 being constantly high or positive before the field effect transistor 204 becomes conducting. The constant high or positive output of the NAND gate 220 maintains the field effect transistor conducting while the field effect transistor 204 is nonconducting.

Operation

When the flashlight with which the switching circuitry 26f is associated is stored in a drawer or other location, the light emitting diode 14f is constantly energized with a minimum flow of current to provide constant illumination of a minimum intensity. This minimal illumination is sufficient to provide a glow which enables the flashlight to be readily located in the dark. However, the current required to effect this minimal energization of the light emitting diode 14f and minimal illumination is so small that there is an insignificant drain on the battery for the flashlight.

When the flashlight is to be utilized, the operator places a portion of his or her body, such as a finger 126 of FIG. 8, in engagement with the brighter touch-sensitive switch 122f. At this time, a resistive conductor is provided through the operator's body between the terminals 128f and 130f of the brighter touch-sensitive switch 122f. This results in current being conducted from the battery to the capacitor 116f and the field effect transistor 42f. This current results in the field effect transistor 42f being rendered effective to conduct current.

When the field effect transistor 42f becomes conducting, there is an increase in the flow of current through the light emitting diode 14f, the field effect transistor 42f and the normally conducting field effect transistor 184. As this current increases, the brightness of the white light emitted by the light emitting diode 14f increases.

When the illumination provided by the light emitting diode has increased to a desired level, the operator releases the brighter touch-sensitive switch 122f. When this occurs, the charge on the capacitor 116f maintains the conductivity of the field effect transistor 42f constant so that current is conducted through the field effect transistor 42f at a constant rate. This results in the light emitting diode 14f being energized to emit white light of a constant intensity. At this time, the capacitor 210 in the strobe circuitry 180 will not have been charged to an extent sufficient to enable the field effect transistor 204 to become conducting and the strobe circuitry 180 will remain in a dormant or non-operating condition.

By maintaining engagement with the terminals 128f and 130f of the touch-sensitive switch 122f, the operator of the flashlight can increase the intensity of the light emitted from the light emitting diode 14f to a maximum intensity. If the operator desires to reduce the intensity of the white light emitted by the diode 14f from a maximum intensity or from an intensity which is less than the maximum intensity, the operator engages the dimmer touch-sensitive switch 124f.

When the operator engages the dimmer touch-sensitive switch 124f, a resistive circuit is completed between the terminals 134f and 136f. This connects the capacitor 116f and the gate 110f of the field effect transistor 42f with the negative side of the battery. The resulting reduction in the electrical potential at the gate 110f of the field effect transistor 42f increases the conductivity of the field effect transistor. Reducing the conductivity of the field effect transistor 42f decreases the flow of current through the light emitting diode 14f with a resulting decrease in the intensity of the light emitted by the diode.

When an operator desires to have the flashlight operate with a strobe effect, that is, with an intermittent flashing light, the operator actuates the brighter touch-sensitive switch 122f to increase the current conducted through the light emitting diode 14f to a maximum. The operator maintains engagement with the brighter touch-sensitive switch 122f for a period of time after the light emitting diode 14f has begun to emit light of a maximum intensity. The capacitor 210 then becomes fully charged. This results in the field effect transistor 204 becoming conducting. When the field effect transistor 204 becomes conducting, the strobe circuitry 180 initiates and maintains a strobe effect.

When the strobe circuitry 180 provides a strobe effect, the field effect transistor 184 is repeatedly rendered conducting and then nonconducting for short periods of time. This results in the light emitting diode 14f being energized and then de-energized for short periods of time. This results in a flashing or strobe effect.

Once the flashing or strobe effect has been obtained, the operator releases the brighter touch-sensitive switch 122f. The capacitors 116f and 210 are then effective to maintain the bright light strobe effect provided by the light emitting diode 14f. Thus, the light emitting diode 14f flashes a bright light for a short period of time and then is off for a short period of time. This sequence is repeated for as long as it is desired to have the strobe effect. When the strobe effect is to be terminated, the operator engages the dimmer touch-sensitive switch 124f.

When the strobe effect is to be initiated, the operator manually actuates the brighter touch-sensitive switch 122f by completing a circuit between the terminals 128f and 130f with a portion of his or her body. As this occurs, the intensity of the illumination provided by the light emitting diode 14f increases to a maximum intensity. The operator of the flashlight then continues to actuate the brighter touch-sensitive switch 122f.

When the capacitor 210 becomes charged to a predetermined level, the field effect transistor 204 becomes conducting. When this occurs, the input to the terminals of the NAND gate 216 changes from a high or positive to low or negative. The output from the NAND gate 216 changes from low to high. The output from the NAND gate 216 remains high until the strobe effect is terminated by actuating the dimmer touch-sensitive switch 124f.

The change in the output from the NAND gate 216 from low to high is conducted to one of the terminals of the NAND gate 220. The NAND gate 224 is initially effective to provide a high output to the NAND gate 220. Therefore, when the output from the NAND gate 216 changes from low to high, both terminals of the NAND gate 220 will be high. This results in the output from the NAND gate 220 changing from high to low. When the output from the NAND gate 220 changes from high to low, the field effect transistor 184 is rendered nonconducting.

When the field effect transistor 184 is turned off, that is, rendered nonconducting, the light emitting diode 14f is de-energized. De-energization of the light emitting diode interrupts the emission of white light of a maximum intensity from the light emitting diode 14f.

When the output from the NAND gate 216 changed from low to high, in response to the field effect transistor 204 changing from a nonconducting condition to a conducting condition, the input to the upper terminal 250 of the NAND gate 224 changed from low to high. Since both the upper and lower terminals 250 and 252 of the NAND gate 224 are now high, the output from the NAND gate 224 changes from high to low. However, the RC timing circuit 228 is effective to prevent the low output from the NAND gate 224 from being immediately transmitted to the NAND gate 220. The capacitor 232 in the timing circuit discharges and both terminals of the NAND gate remain high for a short time.

The change in the output from the NAND gate 224 from high to low is eventually effective to discharge the timing circuit capacitor 232. This results in the low output from the NAND gate 224 being transmitted to NAND gate 220. The output from the NAND gate 220 then changes from low to high. This results in the field effect transistor 184 again being conducting. When the field effect transistor 184 again becomes conducting, the light emitting diode 14f is again energized to emit white light of a maximum intensity.

Once the capacitor 232 discharges, the terminal 252 of the NAND gate 224 changes from high to low. At this time, the terminal 250 of the NAND gate 224 is still high and the output from the NAND gage 220 changes from low to high. This results in the out from the NAND gate 220 changing from high to low so that the field effect transistor 184 is no longer conducting and the bright white light from the diode 14f is interrupted.

The input to the lower terminal 252 of the NAND gate 224 remains high while the capacitor 232 is charged. Once the capacitor 232 becomes charged, the output from the NAND gate 224 again goes low. This results in the output from the NAND 220 going high and the field effect transistor 184 is again conducting to effect energization of the light emitting diode 14f to emit white light of a maximum intensity.

The timing circuit 228 functions as an RC oscillator. This results in the output of the NAND gate 225 repeatedly changing between high and low as the capacitor 232 charges and discharges. When the output from the NAND gate 224 is low, the field effect transistor 184 is conducting. When the field effect transistor 184 is conducting, the semiconductor diode 14f is energized to emit white light of maximum intensity. When the field effect transistor 184 is nonconducting, the diode 14f is de-energized and is ineffective to emit light.

When the strobe effect, that is, the intermittent emission of white light of maximum intensity by the diode 14f, is to be interrupted, the dimmer touch-sensitive switch 124 is actuated. Actuation of the dimmer touch-sensitive switch is accomplished by manually engaging the terminals 134f and 136f. This discharges the capacitor 210 and renders the field effect transistor 204 nonconducting.

Although only the switching circuit 26f has been illustrated in FIG. 11, it should be understood that the switching circuit is associated with a circuit board having the same construction as the circuit board 142 of FIG. 10. The terminals 128f and 130f of the brighter touch-sensitive switch 122f are mounted on a projection, corresponding to the projection 156 of FIG. 10, in the same manner as previously explained in conjunction with the terminals 128 and 130 of the brighter touch-sensitive switch 122. Similarly, the terminals 134f and 136f of the dimmer touch-sensitive switch 124f are mounted on a projection, corresponding to the projection 160 of FIG. 10, in the same manner as in which the terminals 134 and 136 of the dimmer touch-sensitive switch 124 are mounted on the circuit board 142. Components of the switching circuit 26f are mounted on at least one of the major side surfaces 144 of the circuit board 142.

The field effect transistors 184 and 204 in the switching circuitry 26f (FIG. 11) are metal-oxide-silicon-field effect transistors (MOSFETS), the same as the field effect transistor 42 of FIG. 3. However, it should be understood that other known types of semiconductor switching devices could be utilized in place of the field effect transistor 184 and 204 if desired.

Although it is preferred to utilize the touch-sensitive switches 122, 124, 122f and 124f of FIGS. 9 and 11, other known switches could be used if desired. For example, switch apparatus corresponding to the switch 18 of FIGS. 1 and 2 could be utilized. Alternatively, a momentary switch, corresponding to the switch 18d of FIG. 7, could be utilized. However, it is believed that it may be desired to use the touch-sensitive switches 122, 124, 122f and 124f to simplify construction and minimize cost.

Conclusion

The present invention provides a new and improved flashlight 10, 10a, 10b, 10c, 10d, 10e and/or 10f, that is, a source of illumination which is movable by the person operating the flashlight. The flashlight 10–10f includes a light source 14–14f. The light source 14–14f may be a semiconductor diode which is capable of emitting light when energized. Electrical circuitry 26–26f interconnects the diode 14–14f and a source of power which may be a battery 28–28e or a generator 88.

One embodiment of the electrical circuitry 26 is associated with a switch 18 which is operable between a first condition and a second condition. When the switch 18 is in the first condition, the light source 14 is energized to provide light of a low intensity to facilitate locating the flashlight. When the switch 18 is in the second condition, the diode 14 is energized to provide light of a high intensity which may be sufficient to illuminate objects spaced more than six feet from the flashlight. The light source may be a diode 14 which emits white light when energized.

The electrical circuitry may be associated with a manually movable switch member. Upon actuation of the manually movable member, a transistor or other semiconductor device 26 is switched between conducting and nonconducting states. The light source 18, 18d, which may be a white light emitting diode, is changed between a condition in which it is energized to emit high intensity light and low intensity light in response to actuation of the transistor 14a between the conducting and nonconducting states.

A regulator 60 may advantageously be connected with the light source 14b and the source of power 28b to maintain the intensity of the light emitted from the diode or other light source substantially constant. When the diode 14b or other light source is energized to provide high intensity light, the regulator 60 is effective to maintain the intensity of the light constant even though the strength of the source of power connected with the diode decreases. This enables light of a uniform intensity to be obtained from the light emitting diode even though a power source which gradually discharges with the passage of time is used to energize the light emitting diode.

The flashlight may have a touch sensitive switch 18e, 18f. The electrical circuitry connected with the power source 28e and the light source 14e, 14f is operable in response to the touch sensitive switch 18e, 18f being touched by the person operating the flashlight. The touch sensitive switch 18e, 18f may have terminals 128, 130, 134, 136, 128f, 130f, 134f, and 136f which are engagable by a portion of a body of the person operating the flashlight to enable electrical energy to be conducted between the terminals through the body of the person operating the flashlight. A plurality of touch sensitive switches 12, 124, 122f, 124f may be provided to increase and decrease intensity of light emitted from the light source 14e, 14f. The light source 14e, 14f may be energized to provide continuous or intermittent illumination.

There are a plurality of inventive features and embodiments of the invention disclosed herein. The inventive features may be used together or operatively. The features of one embodiment of the invention may be used with features of another embodiment of the invention. For example, the touch-sensitive switch 18e or 18f (FIGS. 9 and 11) may be used with any one of the flashlights of FIGS. 1–11. Alternatively, the switches 18 or 18d may be used with any one of the flashlights of FIGS. 1–11. As another example, the strobe circuitry 180 of FIG. 11 may be associated with any one of the flashlights of FIGS. 1–10.

Having described the invention, the following is claimed:

1. A flashlight to provide a source of illumination which is movable by a person operating the flashlight, said flashlight comprising a housing, a light source connected with said housing, said light source being energizable to provide light to illuminate an object spaced from said housing, a battery connected with said housing, first and second terminals which are engagable by a portion of a body of the person operating said flashlight to enable electrical energy to be conducted between said first and second terminals through the portion of the body of the person operating said flashlight, and electrical circuitry connected with said first and second terminals, said battery and said light source to effect energization of said light source by said battery in response to conduction of electrical energy between said first and second terminals through the portion of the body of the person operating said flashlight.

2. A flashlight as set forth in claim 1 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board.

3. A flashlight as set forth in claim 1 wherein said light source is a semiconductor diode capable of emitting light of an intensity sufficient to illuminate objects spaced more than six feet from said flashlight.

4. A flashlight as set forth in claim 1 wherein said light source is capable of emitting white light of an intensity sufficient to illuminate objects spaced more than six feet from said flashlight.

5. A flashlight as set forth in claim 1 wherein said electrical circuitry is operable between a first condition in which said light source is energized by a first flow of electrical current to provide light of a first intensity to facilitate locating said flashlight and a second condition in which said light source is energized by a second flow of electrical current which is greater than the first flow of electrical current to provide light of a second intensity which is greater than the first intensity, said electrical circuitry being operable between the first and second conditions in response to a conducting of electrical energy between said first and second terminals through the portion of the body of the person operating said flashlight.

6. A flashlight as set forth in claim 1 wherein said electrical circuitry includes a field effect transistor which is operable between a plurality of conditions, said field effect transistor being operable between a first condition in which said electrical circuitry is effective to energize said light source with a first electrical potential to cause said light source to emit light of a first intensity and a second condition in which said electrical circuitry is effective to energize said light source with a second electrical potential which is less than said first electrical potential to cause said light source to emit light of a second intensity which is less than said first intensity, said light source being energized to emit light of an intensity sufficient to illuminate objects spaced more than six feet from said flashlight when said field effect transistor is in the first condition, said light source being energized to emit light of an intensity which is insufficient to illuminate objects spaced more than six feet from said flashlight when said field effect transistor is in the second condition.

7. A flashlight as set forth in claim 6 wherein said light source is a diode capable of emitting white light when energized.

8. A flashlight as set forth in claim 1 wherein said electrical circuitry effects energization of said light source to emit light of an intensity which varies during conduction of electrical energy between said first and second terminals through the portion of the body of the person operating said flashlight.

9. A flashlight as set forth in claim 8 wherein said electrical circuitry is effective to maintain the intensity of the light emitted from the light source constant upon interruption of conduction of electrical energy between said first and second terminals through the portion of the body of the person operating said flashlight.

10. A flashlight as set forth in claim 1 further including third and fourth terminals which are engagable by the portion of the body of the person operating said flashlight to enable electrical energy to be conducted between said third and fourth terminals through the portion of the body of the person operating said flashlight, said electrical circuitry being effective to de-energize said light source in response to conduction of electrical energy between said third and fourth terminals through the portion of the body of the person operating said flashlight.

11. A flashlight as set forth in claim 10 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board, said third and fourth terminals being fixedly connected with said circuit board and being disposed adjacent to at least one of said minor side surfaces of said circuit board.

12. A flashlight as set forth in claim 1 further including third and fourth terminals which are engaged by the portion of the body of the person operating said flashlight to enable electrical energy to be conducted between said third and fourth terminals through the portion of the body of the person operating said flashlight, said electrical circuitry being effective to reduce the intensity of light emitted from said light source in response to conduction of electrical energy between said third and fourth terminals through the portion of the body of the person operating said flashlight.

13. A flashlight as set forth in claim 12 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board, said third and fourth terminals being fixedly connected with said circuit board and being disposed adjacent to at least one of said minor side surfaces of said circuit board.

14. A flashlight as set forth in claim 1 wherein said electrical circuitry effects energization of said light source by said battery from a de-energized condition in which said light source is ineffective to emit light to an energized condition in which said light source is effective to emit light in response to conduction of electrical energy between said first and second terminals through the portion of the body of the person operating said flashlight.

15. A flashlight as set forth in claim 1 wherein said electrical circuitry effects energization of said light source by said battery from a first condition emitting light of a first intensity to second condition emitting light of a second intensity which is greater than said first intensity in response to conduction of electrical energy between said first and second terminals through the portion of the body of the person operating said flashlight.

16. A flashlight as set forth in claim 1 wherein said electrical circuitry effects operation of said light source from a first condition in which said light source continuously emits light to a second condition in which said light source intermittently emits light in response to conduction of electrical energy between said first and second terminals through the portion of the body of the person operating said flashlight.

17. A flashlight to provide a source of illumination which is movable by a person operating the flashlight, said flashlight comprising a semiconductor diode capable of emitting light when energized, a source of power, a touch-sensitive switch, and electrical circuitry connected with said touch-sensitive switch, said source of power and said semiconductor diode, said electrical circuitry being operable in response to said touch-sensitive switch being touched by the person operating said flashlight to effect energization of said semiconductor diode to emit light of an intensity sufficient to illuminate objects spaced from said flashlight.

18. A flashlight as set forth in claim 17 wherein said touch-sensitive switch includes first and second terminals which are engaged by a portion of a body of the person operating said flashlight.

19. A flashlight as set forth in claim 17 further including a second touch-sensitive switch connected with said semiconductor diode, said electrical circuitry being operable in response to said second touch-sensitive switch being touched by the person operating said flashlight to effect de-energization of said semiconductor diode.

20. An apparatus as set forth in claim 17 further including a second touch-sensitive switch connected with said semiconductor diode, said electrical circuitry being operable in response to said second touch-sensitive switch being touched by the person operating said flashlight to effect a reduction in the intensity of light emitted by said semiconductor diode from a first intensity which is sufficient to illuminate objects spaced from said flashlight to an intensity which is insufficient to illuminate an object spaced from said flashlight.

21. A flashlight to provide a source of illumination which is movable by a person operating the flashlight, said flashlight comprising a housing, a light source connected with said housing, said light source being energizable to provide light to illuminate an object spaced from said housing, a battery connected with said housing, first and second terminals which are engagable by a portion of a body of the person operating said flashlight to enable electrical energy to be conducted between said first and second terminals through the portion of the body of the person operating said flashlight, and electrical circuitry connected with said first and second terminals, said battery and said light source, said electrical circuitry being effective to increase intensity of light emitted from said light source to a maximum intensity as a function of duration of engagement of said first and second terminals by the portion of the body of the person operating said flashlight, said electrical circuitry being effective to maintain the intensity of light emitted from said light source constant upon interruption of engagement of said first and second terminals by the portion of the body of the person operating said flashlight.

22. A flashlight as set forth in claim 21 further including third and fourth terminals which are connected with electrical circuitry and are engagable by the portion of the body of the person operating said flashlight, said electrical circuitry being effective to interrupt emission of light from said light source in response to engagement of said third and fourth terminals by the portion of the body of the person operating said flashlight.

23. A flashlight as set forth in claim 21 further including third and fourth terminals which are connected with said electrical circuitry and are engagable by the portion of the body of the person operating said flashlight, said electrical circuitry being effective to reduce the intensity of light emitted from said light source to a predetermined minimum intensity in response to engagement of said third and fourth terminals by the portion of the body of the person operating said flashlight.

24. A flashlight as set forth in claim 21 further including third and fourth terminals which are connected with said electrical circuitry and are engagable by the portion of the body of the person operating said flashlight, said electrical circuitry includes a circuit board having major side surfaces interconnected by minor side surfaces and circuit components connected with said circuit board and disposed adjacent to at least one major side surface of said circuit board, said first, second, third, and fourth terminals being fixedly connected with said circuit board and being disposed adjacent to at least one of said minor side surfaces of said circuit board.

25. A flashlight as set forth in claim 21 wherein said electrical circuitry includes a field effect transistor and a capacitor connected with said field effect transistor, said field effect transistor being in a condition in which it is effective to conduct electrical current which effects energization of said light source when said first and second terminals are engaged by the portion of the body of the person operating said flashlight, said capacitor being effective to provide an electrical potential which is effective to maintain said field effect transistor in the condition in which it is effective to conduct electrical current which effects energization of said light source upon interruption of engagement of said first and second terminals by the portion of the body of the person operating said flashlight.

26. A flashlight as set forth in claim 21 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board.

27. A flashlight as set forth in claim 21 wherein said light source is a semiconductor diode capable of emitting light of an intensity sufficient to illuminate objects spaced more than six feet from said flashlight.

28. A flashlight as set forth in claim 21 wherein said light source is capable of emitting white light of an intensity sufficient to illuminate objects spaced more than six feet from said flashlight.

29. A flashlight as set forth in claim 21 wherein said electrical circuitry is operable between a first condition in which said light source is energized by a first flow of electrical current to provide light of a first intensity to facilitate locating said flashlight and a second condition in which said light source is energized by a second flow of electrical current which is greater than the first flow of electrical current to provide light of a second intensity which is greater than the first intensity, said electrical circuitry being operable between the first and second conditions in response to a conducting of electrical energy between said first and second terminals through the portion of the body of the person operating said flashlight.

30. A flashlight as set forth in claim 21 wherein said electrical circuitry includes a field effect transistor which is operable between a plurality of conditions, said field effect transistor being operable between a first condition in which said electrical circuitry is effective to energize said light source with a first electrical potential to cause said light source to emit light of a first intensity and a second condition in which said electrical circuitry is effective to energize said light source with a second electrical potential which is less than said first electrical potential to cause said light source to emit-light of a second intensity which is less than said first intensity, said light source being energized to emit light of an intensity sufficient to illuminate objects spaced more than six feet from said flashlight when said field effect transistor is in the first condition, said light source being energized to emit light of an intensity which is insufficient to illuminate objects spaced more than six feet from said flashlight when said field effect transistor is in the second condition.

31. A flashlight as set forth in claim 30 wherein said light source is a diode capable of emitting white light when energized.

32. A flashlight as set forth in claim 21 wherein said electrical circuitry effects energization of said light source by said battery from a de-energized condition in which said light source is ineffective to emit light to an energized condition in which said light source is effective to emit light in response to conduction of electrical energy between said first and second terminals through the portion of the body of the person operating said flashlight.

33. A flashlight as set forth in claim 21 wherein said electrical circuitry effects energization of said light source by said battery from a first condition emitting light of a first intensity to second condition emitting light of a second intensity which is greater than said first intensity in response to conduction of electrical energy between said first and second terminals through the portion of the body of the person operating said flashlight.

34. A flashlight as set forth in claim 21 wherein said electrical circuitry effects operation of said light source from a first condition in which said light source continuously emits light to a second condition in which said light source intermittently emits light in response to conduction of electrical energy between said first and second terminals through the portion of the body of the person operating said flashlight.

35. A flashlight to provide a source of illumination which is movable by a person operating the flashlight, said flashlight comprising a housing, a light source connected with said housing, said light source being energizable to provide light to illuminate an object spaced from said housing, a battery connected with said housing, first and second terminals which are engagable by a portion of a body of the person operating said flashlight to enable electrical energy to be conducted between said first and second terminals through the portion of the body of the person operating said flashlight, and electrical circuitry connected with said first and second terminals, said battery and said light source, said electrical circuitry effects operation of said light source from a first condition in which said light source continuously emits light to a second condition in which said light source intermittently emits light in response to conduction of electrical energy between said first and second terminals through the portion of the body of the person operating said flashlight.

36. A flashlight as set forth in claim 35 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board.

37. A flashlight as set forth in claim 35 wherein said light source is a semiconductor diode capable of emitting light of an intensity sufficient to illuminate objects spaced more than six feet from said flashlight.

38. A flashlight as set forth in claim 35 wherein said light source is capable of emitting white light of an intensity sufficient to illuminate objects spaced more than six feet from said flashlight.

39. A flashlight as set forth in claim 35 wherein said light source is a diode capable of emitting white light when energized.

40. A flashlight as set forth in claim 35 further including third and fourth terminals which are engagable by the portion of the body of the person operating said flashlight to enable electrical energy to be conducted between said third and fourth terminals through the portion of the body of the person operating said flashlight, said electrical circuitry being effective to de-energize said light source in response to conduction of electrical energy between said third and fourth terminals through the portion of the body of the person operating said flashlight.

41. A flashlight as set forth in claim 40 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board, said third and fourth terminals being fixedly connected with said circuit board and being disposed adjacent to at least one of said minor side surfaces of said circuit board.

42. A flashlight as set forth in claim 35 further including third and fourth terminals which are engaged by the portion of the body of the person operating said flashlight to enable electrical energy to be conducted between said third and fourth terminals through the portion of the body of the person operating said flashlight, said electrical circuitry being effective to reduce the intensity of light emitted from said light source in response to conduction of electrical energy between said third and fourth terminals through the portion of the body of the person operating said flashlight.

43. A flashlight as set forth in claim 42 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board, said third and fourth terminals being fixedly connected with said circuit board and being disposed adjacent to at least one of said minor side surfaces of said circuit board.

44. A flashlight to provide a source of illumination which is movable by a person operating the flashlight, said flashlight comprising a housing, a light source connected with said housing, said light source being energizable to provide light to illuminate an object spaced from said housing, a battery connected with said housing, first and second terminals which are engagable by a portion of a body of the person operating said flashlight to enable electrical energy to be conducted between said first and second terminals through the portion of the body of the person operating said flashlight, third and fourth terminals which are engagable by the portion of the body of the person operating said flashlight to enable electrical energy to be conducted between said third and fourth terminals through the portion of the body of the person operating said flashlight, and electrical circuitry connected with said first, second, third and fourth terminals, said electrical circuitry being effective to increase intensity of light emitted from said light source in response to engagement of said first and second terminals by the portion of the body of the person operating said flashlight, said electrical circuitry being effective to decrease the intensity of light emitted from said light source in response to engagement of said third and fourth terminals by the portion of the body of the person operating said flashlight.

45. A flashlight as set forth in claim 44 wherein said electrical circuitry is effective to cause said light source to intermittently emit light in response to engagement of said first and second terminals by the portion of the body of the person operating said flashlight when said light source is emitting light of a maximum intensity.

46. A flashlight as set forth in claim 44 wherein said electrical circuitry includes a circuit board having major side surfaces interconnected by minor side surfaces and circuit components connected with said circuit board and disposed adjacent to at least one major side surface of said circuit board, said first, second, third and fourth terminals being fixedly connected with said circuit board and being disposed adjacent to at least one of said minor side surfaces of said circuit board.

47. A flashlight as set forth in claim 44 wherein said light source is a semiconductor diode capable of emitting light of an intensity sufficient to illuminate objects spaced more than six feet from said flashlight.

48. A flashlight as set forth in claim 44 wherein said light source is capable of emitting white light of an intensity sufficient to illuminate objects spaced more than six feet from said flashlight.

49. A flashlight as set forth in claim 44 wherein said electrical circuitry is operable between a first condition in which said light source is energized by a first flow of electrical current to provide light of a first intensity to facilitate locating said flashlight and a second condition in which said light source is energized by a second flow of electrical current which is greater than the first flow of electrical current to provide light of a second intensity which is greater than the first intensity, said electrical circuitry being operable between the first and second conditions in response to a conducting of electrical energy between said first and second terminals through the portion of the body of the person operating said flashlight.

50. A flashlight as set forth in claim 44 wherein said electrical circuitry includes a field effect transistor which is operable between a plurality of conditions, said field effect transistor being operable between a first condition in which said electrical circuitry is effective to energize said light source with a first electrical potential to cause said light source to emit light of a first intensity and a second condition in which said electrical circuitry is effective to energize said light source with a second electrical potential which is less than said first electrical potential to cause said light source to emit light of a second intensity which is less than said first intensity, said light source being energized to emit light of an intensity sufficient to illuminate objects spaced more than six feet from said flashlight when said field effect transistor is in the first condition, said light source being energized to emit light of an intensity which is insufficient to illuminate objects spaced more than six feet from said flashlight when said field effect transistor is in the second condition.

51. A flashlight as set forth in claim 50 wherein said light source is a diode capable of emitting white light when energized.

52. A flashlight as set forth in claim 44 wherein said electrical circuitry is effective to maintain the intensity of the light emitted from the light source constant upon interruption of conduction of electrical energy between said first and second terminals through the portion of the body of the person operating said flashlight.

53. A flashlight as set forth in claim 44 wherein said electrical circuitry is effective to de-energize said light source in response to conduction of electrical energy between said third and fourth terminals through the portion of the body of the person operating said flashlight.

54. A flashlight as set forth in claim 44 wherein said electrical circuitry effects energization of said light source by said battery from a de-energized condition in which said light source is ineffective to emit light to an energized condition in which said light source is effective to emit light in response to conduction of electrical energy between said first and second terminals through the portion of the body of the person operating said flashlight.

55. A flashlight as set forth in claim 44 wherein said electrical circuitry effects operation of said light source from a first condition in which said light source continuously emits light to a second condition in which said light source intermittently emits light in response to conduction of electrical energy between said first and second terminals through the portion of the body of the person operating said flashlight.

56. A flashlight to provide a source of illumination which is movable by a person operating the flashlight, said flashlight comprising a housing, a semiconductor diode connected with said housing, said semiconductor diode being energizable with a first electrical potential to emit light of a low intensity which is ineffective to illuminate objects spaced more than a first distance from said flashlight, said semiconductor diode being energizable with a second electrical potential to emit light of a maximum intensity which is effective to illuminate objects spaced more than the first distance from said flashlight, a battery connected with said housing, switch apparatus operable by the person operating said flashlight, electrical circuitry connected with said switch apparatus, said battery and said semiconductor diode, said switch apparatus being operable by the person operating said flashlight to increase electrical potential conducted from said battery through said electrical circuitry to said semiconductor diode from said first electrical potential to said second electrical potential to increase the intensity of the light emitted by said semiconductor diode from said low intensity to said maximum intensity.

57. A flashlight as set forth in claim 56 wherein said electrical circuitry includes a circuit board having major side surfaces interconnected by minor side surfaces and circuit components connected with said circuit board and disposed adjacent to at least one major side surface of said circuit board, said switch apparatus includes at least one terminal which is fixedly connected with said circuit board and is disposed adjacent to at least one of said minor side surfaces of said circuit board.

58. A flashlight as set forth in claim 56 wherein said semiconductor diode emits light of an intensity sufficient to illuminate objects spaced more than six feet from said flashlight when said semiconductor diode is energized with said second electrical potential.

59. A flashlight as set forth in claim 56 wherein said semiconductor diode emits white light of an intensity sufficient to illuminate objects spaced more than six feet from said flashlight when said semiconductor diode is energized with said second electrical potential.

60. A flashlight as set forth in claim 56 wherein said electrical circuitry includes a field effect transistor which is operable between a plurality of conditions, said field effect transistor being operable between a first condition in which said electrical circuitry is effective to energize said semiconductor diode with the first electrical potential to cause said semiconductor diode to emit light of said low intensity and a second condition in which said electrical circuitry is effective to energize said semiconductor diode with the second electrical potential which is greater than said first electrical potential to cause said semiconductor diode to emit light of said maximum intensity.

61. A flashlight as set forth in claim 56 wherein said switch apparatus includes first and second terminals which are engagable by a portion of a body of the person operating said flashlight to enable electrical energy to be conducted between said first and second terminals through the body of the person operating said flashlight, said electrical circuitry effects energization of said semiconductor diode to emit light of an intensity which varies during conduction of electrical energy between said first and second terminals through the portion of the body of the person operating said flashlight.

62. A flashlight as set forth in claim 61 wherein said electrical circuitry is effective to maintain the intensity of the light emitted from said semiconductor diode constant upon interruption of conduction of electrical energy between said first and second terminals through the portion of the body of the person operating said flashlight.

63. A flashlight as set forth in claim 61 wherein said switch apparatus includes third and fourth terminals which are engagable by the portion of the body of the person operating said flashlight to enable electrical energy to be conducted between said third and fourth terminals through the portion of the body of the person operating said flashlight, said electrical circuitry being effective to de-energize said semiconductor diode in response to conduction of electrical energy between said third and fourth terminals through the portion of the body of the person operating said flashlight.

64. A flashlight as set forth in claim 63 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board, said third and fourth terminals being fixedly connected with said circuit board and being disposed adjacent to at least one of said minor side surfaces of said circuit board.

65. A flashlight as set forth in claim 61 wherein said switch apparatus includes third and fourth terminals which are engaged by the portion of the body of the person operating said flashlight to enable electrical energy to be conducted between said third and fourth terminals through the portion of the body of the person operating said flashlight, said electrical circuitry being effective to reduce the intensity of light emitted from said semiconductor diode in response to conduction of electrical energy between said third and fourth terminals through the portion of the body of the person operating said flashlight.

66. A flashlight as set forth in claim 65 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board, said third and fourth terminals being fixedly connected with said circuit board and being disposed adjacent to at least one of said minor side surfaces of said circuit board.

67. A flashlight as set forth in claim 56 wherein said electrical circuitry effects energization of said semiconductor diode by said battery from a de-energized condition in which said semiconductor diode is ineffective to emit light to an energized condition in which said semiconductor diode is effective to emit light of the low intensity in response operation of said switch apparatus.

68. A flashlight as set forth in claim 56 wherein said electrical circuitry effects operation of said semiconductor diode from a condition in which said semiconductor diode continuously emits light to a second condition in which said semiconductor diode intermittently emits light in response to operation of said switch apparatus.

69. A flashlight to provide a source of illumination which is movable by a person operating the flashlight, said flashlight comprising a housing, a semiconductor diode connected with said housing, said semiconductor diode being energizable to provide white light to illuminate an object spaced from said housing, a battery connected with said housing, switch apparatus operable by the person operating said flashlight, and electrical circuitry connected with said switch apparatus, said battery and said semiconductor diode, said electrical circuitry effects operation of said semiconductor diode from a first condition in which said semiconductor diode continuously emits white light to a second condition in which said semiconductor diode intermittently emits white light in response to actuation of said switch apparatus by the person operating said flashlight.

70. A flashlight as set forth in claim 69 wherein said switch apparatus is operable by the person operating said flashlight to increase electrical potential conducted from said battery through said electrical circuitry to said semiconductor diode from a first electrical potential to a second electrical potential to increase the intensity of the white light emitted by said semiconductor electrode from a low intensity to a maximum intensity when said semiconductor diode is in the first condition.

71. A flashlight as set forth in claim 70 wherein said electrical circuitry includes a circuit board having major side surfaces interconnected by minor side surfaces and circuit components connected with said circuit board and disposed adjacent to at least one major side surface of said circuit board, said switch apparatus includes at least one terminal which is fixedly connected with said circuit board and is disposed adjacent to at least one of said minor side surfaces of said circuit board.

72. A flashlight as set forth in claim 70 wherein said semiconductor diode emits white light of an intensity sufficient to illuminate objects spaced more than six feet from said flashlight when said semiconductor diode is in the first condition and is energized with said second electrical potential.

73. A flashlight as set forth in claim 69 wherein said electrical circuitry includes a field effect transistor which is operable between a plurality of conditions, said field effect transistor being operable between a first condition and a second condition, said electrical circuitry is effective to energize said semiconductor diode with the first electrical potential to cause said semiconductor diode to emit white light of a low intensity when said semiconductor diode is in the first condition of said semiconductor diode and said field effect transistor is in the first condition of said field effect transistor, said electrical circuitry is effective to energize said semiconductor diode with a second electrical potential which is greater than said first electrical potential to cause said semiconductor diode to emit light of a maximum intensity.

74. A flashlight as set forth in claim 69 wherein said switch apparatus includes first and second terminals which are engagable by a portion of a body of the person operating said flashlight to enable electrical energy to be conducted between said first and second terminals through the body of the person operating said flashlight, said electrical circuitry effects energization of said semiconductor diode to emit white light of an intensity which varies during conduction of electrical energy between said first and second terminals through the portion of the body of the person operating said flashlight when said semiconductor diode is in the first condition.

75. A flashlight as set forth in claim 74 wherein said electrical circuitry is effective to maintain the intensity of the white light emitted from said semiconductor diode constant upon interruption of conduction of electrical energy between said first and second terminals through the portion of the body of the person operating said flashlight when said semiconductor diode is in the first condition.

76. A flashlight as set forth in claim 74 wherein said switch apparatus includes third and fourth terminals which are engagable by the portion of the body of the person operating said flashlight to enable electrical energy to be conducted between said third and fourth terminals through the portion of the body of the person operating said flashlight, said electrical circuitry being effective to de-energize said semiconductor diode in response to conduction of electrical energy between said third and fourth terminals through the portion of the body of the person operating said flashlight when said semiconductor diode is in the first condition.

77. A flashlight as set forth in claim 76 wherein said electrical circuitry includes a circuit board having major side surfaces interconnected by minor side surfaces and circuit components connected with said circuit board and disposed adjacent to at least one major side surface of said circuit board, said first and second terminals being fixedly connected with said circuit board and being disposed adjacent to at least one of said minor side surfaces of said circuit board, said third and fourth terminals being fixedly connected with said circuit board and being disposed adjacent to at least one of said minor side surfaces of said circuit board.

78. A flashlight as set forth in claim 74 wherein said switch apparatus includes third and fourth terminals which are engaged by the portion of the body of the person operating said flashlight to enable electrical energy to be conducted between said third and fourth terminals through the portion of the body of the person operating said flashlight, said electrical circuitry being effective to reduce the intensity of white light emitted from said semiconductor diode in response to conduction of electrical energy between said third and fourth terminals through the portion of the body of the person operating said flashlight when said semiconductor diode is in the first condition.

79. A flashlight to provide a source of illumination which is movable by a person operating the flashlight, said flashlight comprising a housing, a light source connected with said housing, said light source being energizable to provide light to illuminate an object spaced from said housing, a battery connected with said housing, at least one terminal which is engagable by a portion of a body of the person operating said flashlight to enable electrical energy to be conducted through the portion of the body of the person operating said flashlight, and electrical circuitry connected with said one terminal, said battery and said light source to effect energization of said light source by said battery in response to conduction of electrical energy through the portion of the body of the person operating said flashlight.

80. A flashlight as set forth in claim 79 wherein said electrical circuitry includes a circuit board having major side surfaces interconnected by minor side surfaces and circuit components connected with said circuit board and disposed adjacent to at least one major side surface of said circuit board, said one terminal being fixedly connected with said circuit board and being disposed adjacent to at least one of said minor side surfaces of said circuit board.

81. A flashlight as set forth in claim 79 wherein said light source is a semiconductor diode capable of emitting light of an intensity sufficient to illuminate objects spaced more than six feet from said flashlight.

82. A flashlight as set forth in claim 79 wherein said light source is capable of emitting white light of an intensity sufficient to illuminate objects spaced more than six feet from said flashlight.

83. A flashlight as set forth in claim 79 wherein said electrical circuitry is operable between a first condition in which said light source is energized by a first flow of electrical current to provide light of a first intensity to facilitate locating said flashlight and a second condition in which said light source is energized by a second flow of electrical current which is greater than the first flow of electrical current to provide light of a second intensity which is greater than the first intensity, said electrical circuitry being operable between the first and second conditions in response to a conducting of electrical energy through the portion of the body of the person operating said flashlight.

84. A flashlight as set forth in claim 79 wherein said electrical circuitry includes a field effect transistor which is operable between a plurality of conditions, said field effect transistor being operable between a first condition in which said electrical circuitry is effective to energize said light source with a first electrical potential to cause said light source to emit light of a first intensity and a second condition in which said electrical circuitry is effective to energize said light source with a second electrical potential which is less than said first electrical potential to cause said light source to emit light of a second intensity which is less than said first intensity, said light source being energized to emit light of an intensity sufficient to illuminate objects spaced more than six feet from said flashlight when said field effect transistor is in the first condition, said light source being energized to emit light of an intensity which is insufficient to illuminate objects spaced more than six feet from said flashlight when said field effect transistor is in the second condition.

85. A flashlight as set forth in claim 84 wherein said light source is a diode capable of emitting white light when energized.

86. A flashlight as set forth in claim 79 wherein said electrical circuitry effects energization of said light source to emit light of an intensity which varies during conduction of electrical energy through the portion of the body of the person operating said flashlight.

87. A flashlight as set forth in claim 86 wherein said electrical circuitry is effective to maintain the intensity of the light emitted from the light source constant upon interruption of conduction of electrical energy through the portion of the body of the person operating said flashlight.

88. A flashlight as set forth in claim 79 further including another terminal which is engagable by the portion of the body of the person operating said flashlight to enable electrical energy to be conducted through the portion of the body of the person operating said flashlight, said electrical circuitry being effective to de-energize said light source in response to conduction of electrical energy through the portion of the body of the person operating said flashlight at said other terminal.

89. A flashlight as set forth in claim 88 wherein said electrical circuitry includes a circuit board having major side surfaces interconnected by minor side surfaces and circuit components connected with said circuit board and disposed adjacent to at least one major side surface of said circuit board, said one terminal and said other terminal being fixedly connected with said circuit board and being disposed adjacent to at least one of said minor side surfaces of said circuit board.

90. A flashlight as set forth in claim 79 further including another terminal which is engaged by the portion of the body of the person operating said flashlight to enable electrical energy to be conducted through the portion of the body of the person operating said flashlight, said electrical circuitry being effective to reduce the intensity of light emitted from said light source in response to conduction of electrical energy through the portion of the body of the person operating said flashlight.

91. A flashlight as set forth in claim 90 wherein said electrical circuitry includes a circuit board having major side surfaces interconnected by minor side surfaces and circuit components connected with said circuit board and disposed adjacent to at least one major side surface of said circuit board, said one terminal and said other terminal being fixedly connected with said circuit board and being disposed adjacent to at least one of said minor side surfaces of said circuit board, said one terminal and said other terminal being fixedly connected with said circuit board and being disposed adjacent to at least one of said minor side surfaces of said circuit board.

92. A flashlight as set forth in claim 79 wherein said electrical circuitry effects energization of said light source by said battery from a de-energized condition in which said light source is ineffective to emit light to an energized condition in which said light source is effective to emit light in response to conduction of electrical energy through the portion of the body of the person operating said flashlight.

93. A flashlight as set forth in claim 79 wherein said electrical circuitry effects energization of said light source by said battery from a first condition emitting light of a first intensity to second condition emitting light of a second intensity which is greater than said first intensity in response to conduction of electrical energy through the portion of the body of the person operating said flashlight.

94. A flashlight as set forth in claim 79 wherein said electrical circuitry effects operation of said light source from a first condition in which said light source continuously emits light to a second condition in which said light source intermittently emits light in response to conduction of electrical energy through the portion of the body of the person operating said flashlight.

* * * * *